US010045061B2

(12) United States Patent
Kim et al.

(10) Patent No.: US 10,045,061 B2
(45) Date of Patent: Aug. 7, 2018

(54) ELECTRONIC DEVICE, ADAPTER DEVICE, AND VIDEO DATA PROCESSING METHOD THEREOF

(71) Applicant: Samsung Electronics Co., Ltd., Suwon-si, Gyeonggi-do (KR)

(72) Inventors: Soon Do Kim, Seoul (KR); Min Jung Kim, Hwaseong-si (KR); Woo Kwang Lee, Suwon-si (KR); Jin Yong Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 15/095,736

(22) Filed: Apr. 11, 2016

(65) Prior Publication Data
US 2016/0323620 A1    Nov. 3, 2016

(30) Foreign Application Priority Data

Apr. 30, 2015 (KR) .................. 10-2015-0061961
Feb. 1, 2016 (KR) .................. 10-2016-0012127

(51) Int. Cl.
*H04L 29/06* (2006.01)
*H04N 21/41* (2011.01)
(Continued)

(52) U.S. Cl.
CPC ..... *H04N 21/4126* (2013.01); *G06F 13/1673* (2013.01); *G06F 13/385* (2013.01);
(Continued)

(58) Field of Classification Search
CPC ............ H04N 21/4126; H04N 19/423; H04N 21/4122; H04N 21/41407;
(Continued)

(56) References Cited

U.S. PATENT DOCUMENTS 8,686,600 B2    4/2014 Terlizzi et al.
8,806,067 B2    8/2014 Terlizzi et al.
(Continued)

FOREIGN PATENT DOCUMENTS

EP    2 605 531 A2    6/2013
EP    2 843 958 A1    3/2015
(Continued)

OTHER PUBLICATIONS

Hitachi, Ltd. et al.; High-Definition Multimedia Interface; Specification Version 1.3a; HDMI Licensing, LLC; Nov. 10, 2006.
(Continued)

*Primary Examiner* — Michael S McNally
(74) *Attorney, Agent, or Firm* — Jefferson IP Law, LLP

(57) ABSTRACT

An electronic device is provided. The electronic device includes a first buffer configured to store video data and a system on chip. The system on chip may include a compression module configured to compress the video data stored in the first buffer, an encryption module configured to encrypt the compressed video data, and a universal serial bus (USB) hardware interface configured to transmit the encrypted video data. The compression module, the encryption module, and the USB hardware interface may be connected by a hardware signal line which is used to transmit video data.

21 Claims, 17 Drawing Sheets

(51) Int. Cl.
*G11B 27/031* (2006.01)
*H04N 21/414* (2011.01)
*H04N 21/4363* (2011.01)
*H04N 21/4367* (2011.01)
*H04N 21/4405* (2011.01)
*H04N 21/4408* (2011.01)
*H04N 19/423* (2014.01)
*G06F 13/16* (2006.01)
*G06F 13/38* (2006.01)
*G06F 13/42* (2006.01)

(52) U.S. Cl.
CPC ........ *G06F 13/4282* (2013.01); *G11B 27/031* (2013.01); *H04N 19/423* (2014.11); *H04N 21/4122* (2013.01); *H04N 21/41407* (2013.01); *H04N 21/4367* (2013.01); *H04N 21/43632* (2013.01); *H04N 21/43635* (2013.01); *H04N 21/4405* (2013.01); *H04N 21/4408* (2013.01)

(58) Field of Classification Search
CPC ....... H04N 21/43632; H04N 21/43635; H04N 21/4367; H04N 21/4405; H04N 21/4408; G06F 13/1673; G06F 13/385; G06F 13/4282; G11B 27/031
USPC ....................................................... 380/217
See application file for complete search history.

(56) References Cited

U.S. PATENT DOCUMENTS

| | | | |
|---|---|---|---|
| 8,848,910 B2 | 9/2014 | Mulcahy | |
| 9,112,327 B2 | 8/2015 | Sarwar et al. | |
| 9,293,876 B2 | 3/2016 | Terlizzi et al. | |
| 2002/0163522 A1* | 11/2002 | Porter | G06F 12/1441 |
| | | | 345/533 |
| 2004/0117538 A1 | 6/2004 | Liu | |
| 2004/0130505 A1 | 7/2004 | Lee et al. | |
| 2010/0057972 A1* | 3/2010 | Stangl | G06F 3/14 |
| | | | 710/305 |
| 2010/0260336 A1 | 10/2010 | Mulcahy | |
| 2011/0055864 A1* | 3/2011 | Shah | H04N 7/1675 |
| | | | 725/31 |
| 2012/0099832 A1 | 4/2012 | Gupta et al. | |
| 2013/0003863 A1 | 1/2013 | Hutchings et al. | |
| 2013/0115817 A1 | 5/2013 | Terlizzi et al. | |
| 2013/0117470 A1 | 5/2013 | Terlizzi et al. | |
| 2013/0152149 A1* | 6/2013 | Park | H04N 21/4126 |
| | | | 725/114 |
| 2013/0217274 A1* | 8/2013 | Bar-Niv | H01R 27/02 |
| | | | 439/676 |
| 2013/0244489 A1 | 9/2013 | Terlizzi et al. | |
| 2013/0244491 A1 | 9/2013 | Sarwar et al. | |
| 2014/0181328 A1 | 6/2014 | Terlizzi et al. | |
| 2014/0267321 A1 | 9/2014 | Stoye | |
| 2014/0267910 A1 | 9/2014 | Chugh et al. | |
| 2014/0337929 A1 | 11/2014 | Lee et al. | |
| 2015/0006673 A1 | 1/2015 | Nair | |
| 2016/0005379 A1 | 1/2016 | Stoye | |
| 2016/0127770 A1 | 5/2016 | Je et al. | |

FOREIGN PATENT DOCUMENTS

| | | |
|---|---|---|
| KR | 10-2014-0124484 A | 10/2014 |
| KR | 10-2014-0133047 A | 11/2014 |
| WO | 2013/022193 A1 | 2/2013 |

OTHER PUBLICATIONS

Promoter Group; Universal Serial Bus Type-C Cable and Connector Specification; Revision 1.0; Aug. 11, 2014.

* cited by examiner

ELECTRONIC DEVICE, ADAPTER DEVICE, AND VIDEO DATA PROCESSING METHOD THEREOF

CROSS-REFERENCE TO RELATED APPLICATION(S)

This application claims the benefit under 35 U.S.C. § 119(a) of a Korean patent application filed on Apr. 30, 2015 in the Korean Intellectual Property Office and assigned Serial number 10-2015-0061961, and of a Korean patent application filed on Feb. 1, 2016 in the Korean Intellectual Property Office and assigned Serial number 10-2016-0012127, the entire disclosure of each of which is hereby incorporated by reference.

TECHNICAL FIELD

The present disclosure relates to a method of processing image data and transmitting the processed image data to an external device.

BACKGROUND

Various electronic devices are being developed as electronic technologies have advanced. For example, portable electronic devices such as cellular phones, tablet personal computers (PCs), and the like are widely popularized as electronic devices are miniaturized.

The performance of recently popularized portable electronic devices is being improved to store and reproduce high-definition (HD) image data, such as full HD (FHD) image data, ultra HD (UHD) image data, and the like. Furthermore, there is being developed a technique which allows a portable electronic device to be connected with a display device (e.g., a television (TV)) so as to reproduce an image stored in the portable electronic device through the TV in real time.

To transmit video data stored in a portable electronic device to an external device in real time, there is a need to process the video data in a format supported by the external device and to transmit the processed result through an interface supported by the external device.

As such, an additional circuit and a separate interface needed to process a video are implemented in the portable electronic device, and the quality of video data is deteriorated due to noise generated during an image processing process.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, an adapter device, and an image data processing method thereof capable of simplifying the procedure for processing video data and transmitting video data through an interface provided in a portable electronic device.

In accordance with an aspect of the present disclosure, an electronic device is provided. The electronic device may include a first buffer configured to store video data and a system on chip. The system on chip may include a compression module configured to compress the video data stored in the first buffer, an encryption module configured to encrypt the compressed video data, and a universal serial bus (USB) hardware interface configured to transmit the encrypted video data. The compression module, the encryption module, and the USB hardware interface may be connected by a hardware signal line which is used to transmit video data.

In accordance with another aspect of the present disclosure, an electronic device is provided. The electronic device may include a first buffer configured to store video data, a compression module configured to compress the video data, an encryption module configured to encrypt the compressed video data, and a USB hardware interface configured to transmit the encrypted video data to an external device.

In accordance with another aspect of the present disclosure, a system on chip is provided. The system on chip may include a compression module configured to compress video data, an encryption module configured to encrypt the compressed video data, and a USB hardware interface configured to transmit the encrypted video data. The compression module, the encryption module, and the USB hardware interface may be connected by a hardware signal line which is used to transmit video data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
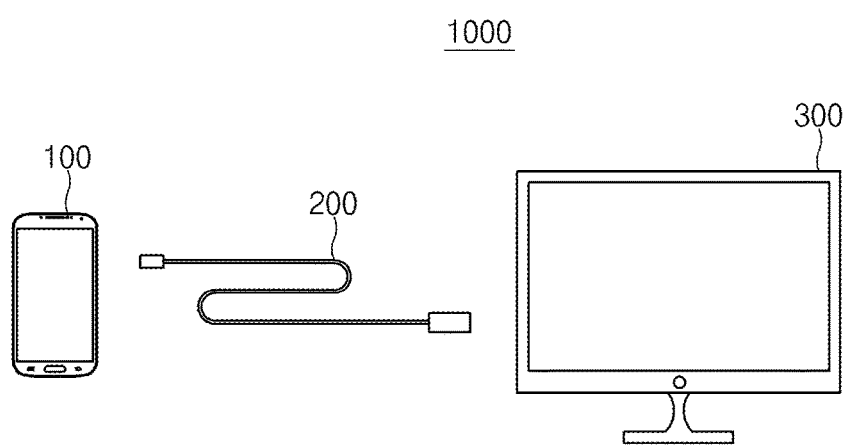
FIG. 1 is a diagram illustrating a display system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, the expressions "have", "may have", "include" and "comprise", or "may include" and "may comprise" as used herein indicate the existence of a corresponding features (e.g., elements such as numeric values, functions, operations, or components) but do not exclude the presence of additional features.

In the following disclosure, the expressions "A or B", "at least one of A or/and B", or "one or more of A or/and B", and the like as used herein may include any and all combinations of one or more of the associated listed items. For example, the each of the terms "A or B", "at least one of A and B", or "at least one of A or B" may refer to all of the case (1) where at least one A is included, the case (2) where at least one B is included, or the case (3) where both of at least one A and at least one B are included.

The terms such as "first", "second", and the like as used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" as used herein may be used as, for example, the expression "suitable for", "having the capacity to", "designed to", "adapted to", "made to", or "capable of". The term "configured to" must not be construed to mean only "specifically designed to" in hardware. Instead, the expression "a device configured to" may mean that the device is "capable of" operating together with another device or other components. A central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include, for example, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sale (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to various embodiments of the present disclosure will be described with reference to the accompanying drawings. The term "user" as used herein may refer to a person who uses an electronic device or may refer to a device (e.g., an artificial electronic device) that uses an electronic device.

FIG. 1 is a diagram illustrating a display system according to various embodiments of the present disclosure.

Referring to FIG. 1, a display system 1000 may include a first electronic device 100, an adapter device 200, and a second electronic device 300. The first electronic device 100 and the second electronic device 300 may be interconnected through the adapter device 200.

According to an embodiment, the first electronic device 100 may be a portable electronic device such as a smartphone, a tablet PC, or a wearable device (e.g., a smart watch, smart glasses, or the like). According to an embodiment, the first electronic device 100 may transmit high-definition (HD) video data, such as HD, full HD (FHD), quad HD (QHD), ultra HD (UHD), and the like, to the adapter device 200.

The adapter device 200 may convert video data received from the first electronic device 100 into video data of which the format is supported by the second electronic device 300 and may transmit the converted video data to the second electronic device 300.

According to an embodiment, the second electronic device 300 may be a display device such as a TV, a monitor, or the like. According to an embodiment, the second electronic device 300 may reproduce an HD video received through the adapter device 200 from the first electronic device 100 in real time.

A portable electronic device such as a cellular phone of the related art includes a high-definition multimedia interface (HDMI) module and a mobile high-definition link (MHL) module to transmit HD video data to a display device such as TV. The HDMI module may convert video data to be transmitted into an HDMI signal through HDMI encoding, and the MHL module may convert the HDMI signal into an MHL signal and may transmit the MHL signal to the display device. According to various embodiments of the present disclosure, the first electronic device 100 may compress and encrypt video data to be transmitted without the HDMI module and the MHL module and may transmit the compressed and encrypted video data to the TV through the adapter device 200.

Figure 2:
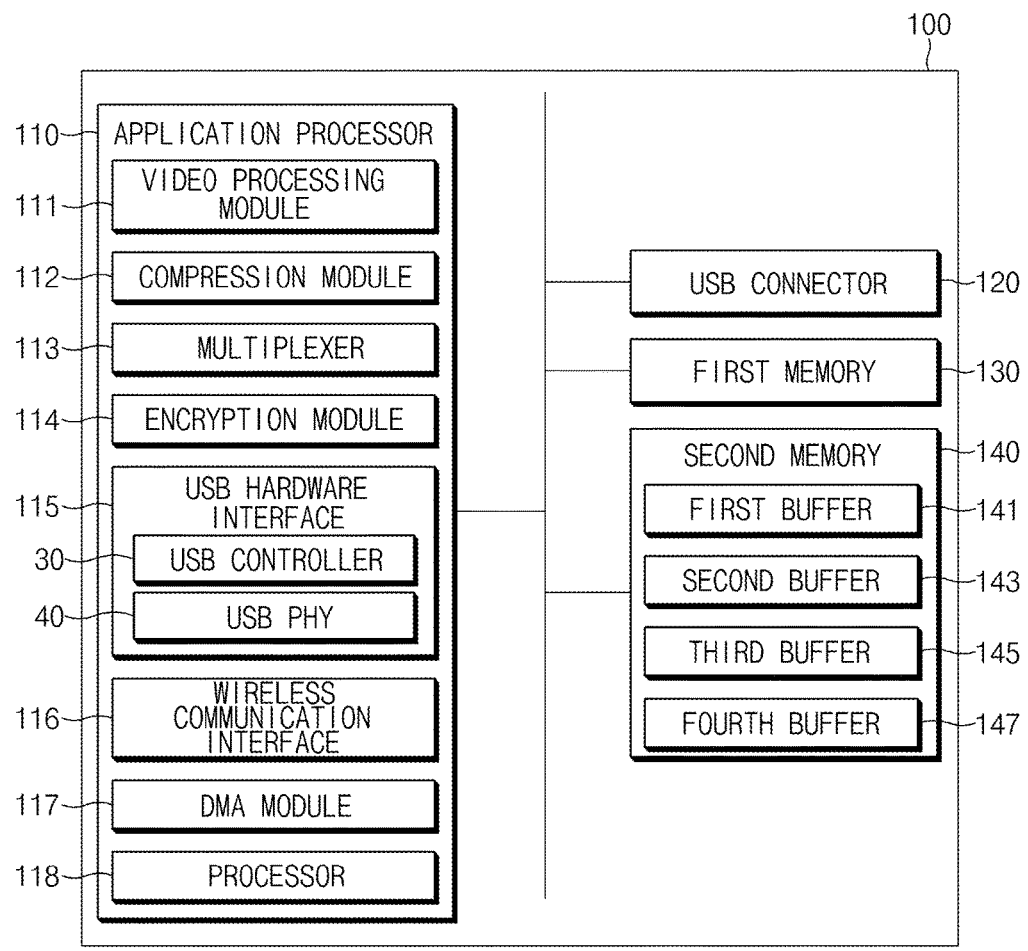
FIG. 2 is a block diagram illustrating a configuration of a first electronic device according to various embodiments of the present disclosure.

FIG. 2 is a block diagram illustrating a configuration of a first electronic device according to various embodiments of the present disclosure.

Referring to FIG. 2, the first electronic device 100 may include an AP 110, a universal serial bus (USB) connector 120, a first memory 130, and a second memory 140.

According to an embodiment, the AP 110 may include a video processing module 111, a compression module 112, a multiplexer 113, an encryption module 114, a USB hardware interface 115, a wireless communication interface 116, a direct memory access (DMA) module 117, and a processor 118. According to an embodiment, the AP 110 may be implemented with a system on chip (SoC) which includes at least one of the video processing module 111, the compression module 112, the multiplexer 113, the encryption module 114, the USB hardware interface 115, the wireless communication interface 116, the DMA module 117, and the processor 118. According to various embodiments, the video processing module 111, the compression module 112, the multiplexer 113, the encryption module 114, and the USB hardware interface 115 may be implemented with a hardware module or a software module. For example, each of the video processing module 111, the compression module 112, the multiplexer 113, the encryption module 114, and the USB hardware interface 115 may be implemented with a hardware module or a software module. As another example, a portion of the video processing module 111, the compression module 112, the multiplexer 113, the encryption module 114, and the USB hardware interface 115 may be implemented with a hardware module, and the rest may be implemented with a software module. According to an embodiment, at least a portion of the multiplexer 113 and the wireless communication interface 116 may not be included in the first electronic device 100.

In the case where the AP 110 is implemented with an SoC including the video processing module 111, the compression module 112, the multiplexer 113, the encryption module 114, the USB hardware interface 115, and the processor 118, an additional circuit or chip for processing video data may not be required, thereby reducing noise generated during a video processing procedure. Furthermore, wireless video transmission may be possible because the video processing procedure is all performed in the AP 110.

According to an embodiment, the video processing module 111 may create a first buffer 141 on the second memory 140. According to an embodiment, the video processing module 111 may process video data stored in the first memory 130 or video data received from an external device thereof and may store the processed result in the first buffer 141. According to an embodiment, the video processing module 111 may generate video data to be displayed on an internal display device or an external display device (e.g., the second electronic device 300) and may store the video data thus generated in the first buffer 141. The first buffer 141 may be, for example, a frame buffer. In an embodiment, the video data may have a pixel format such as red, green, blue (RGB), YUV, or the like or an image format such as a bitmap (BMP) or the like. According to an embodiment, video data stored in the first buffer 141 may be provided to the compression module 112. According to another embodiment, the video processing module 111 may process video data and may provide the processed video data directly to the compression module 112 without storing it in the first buffer 141.

According to an embodiment, the compression module 112 may compress video data received from the first buffer 141 or the video processing module 111. According to an embodiment, the compression module 112 may perform visually lossless compression in real time. The compression module 112 may be, for example, a display stream compression (DSC) module of a video electronics standards association (VESA) standard or a proprietary compression module corresponding thereto. The DSC module may compress video data in real time using a DSC compression technique. According to an embodiment, the compression module 112 may compress video data using the LEGO compression technique of Samsung Electronics. The LEGO compression technique may have four compression modes. According to the LEGO compression technique, a compression mode that is most suitable for attributes of a frame may be selected, and compression may be made in the selected compression spring mode. According to an embodiment, the compression module 112 may compress video data using various compression techniques in addition to the DSC and LEGO. For example, the compression module 112 may compress video data using compression techniques such as H.264 (MPEG-4) or H.265 (high-efficiency video coding (HEVC)). According to various embodiments, video data compressed by the compression module 112 may be provided to the multiplexer 113, the encryption module 114, or a second buffer 143.

According to various embodiments, video data stored in the first buffer 141 may be provided to the multiplexer 113, the encryption module 114, or the second buffer 143 in a non-compression form without a compression operation of the compression module 112. For example, in the case where it is possible to reproduce video data, which is transmitted without compression, at the second electronic device 300 in real time (e.g., in the case where a speed of transmitting video data is faster than a speed of reproducing the video data), a compression process of the compression module 112 may be skipped.

According to an embodiment, the multiplexer 113 may provide a multiplexing function of combining video data received from the compression module 112 or the second buffer 142 and audio data received from a fourth buffer 147. According to an embodiment, the video data multiplexed with the audio data by the multiplexer 113 may be provided to the encryption module 114. According to an embodiment, in the case where video data and audio data are transmitted independently of each other (e.g., in the case where the video data and the audio data are transmitted over separate communication channels (e.g., endpoints)), the multiplexing process of the multiplexer 113 may be skipped.

According to an embodiment, the encryption module 114 may encrypt video data received from the compression module 112, the multiplexer 113, or the second buffer 143.

According to an embodiment, the encryption module 114 may be used to protect content and may be a high-bandwidth digital content protection (HDCP) module or a display port content protection (DPCP) module. According to various embodiments, video data encrypted by the encryption module 114 may be provided to the USB hardware interface 115, a third buffer 145, or the wireless communication interface 116. According to various embodiments, the video data encrypted by the encryption module 114 may be provided to the USB hardware interface 115 or the third buffer 145. According to an embodiment, the USB hardware interface 115 may transmit and receive video data and a control signal (or control data) to and from an external device (i.e., the outside of an AP chip) of the AP 110. According to an embodiment, the USB hardware interface 115 may transmit the encrypted video data received from the encryption module 114 or the third buffer 145 to an external device of the AP 110. According to an embodiment, the USB hardware interface 115 may be connected with a USB connector 120. If the USB connector 120 is connected with a connector included in the adapter device 200, the USB hardware interface 115 may transmit video data to the adapter device 200 through the USB connector 120.

According to various embodiments, the USB hardware interface 115 may transmit video data received from the video processing module 111, the compression module 112, the multiplexer 113, the first buffer 141, or the second buffer 143 as well as video data received from the embodiment module 114 or the third buffer 145.

According to an embodiment, the USB hardware interface 115 may include at least one USB controller 30 and at least one USB physical transceiver (USB PHY) 40.

The USB interface defined by the USB standard group (USB.org) may support an operation in which a USB host (a central device) and a USB device (a peripheral device) are interconnected according to the standard protocol. The USB host may verify descriptor information of a USB device through a USB enumeration process and may discover and recognize a USB device. The USB device may include various classes, and an operating system (OS) of the USB host may determine a software driver to be used for a connected USB device and may implement a protocol stack (e.g., a USB class driver) corresponding to classes of the USB device on software. For example, USB software (e.g., a USB class driver) of the USB host may generate USB formatted data based on the USB standard interface. The USB hardware (or the USB hardware interface 115) of the USB host may convert a transaction request of the USB formatted data, which is generated by the USB software, into a signal suitable for USB LINK standard and PHY standard (e.g., serialize data so as to be converted into a physical signal) and may transmit the converted signal to an external USB device through the USB interface. In various mobile electronic devices, USB hardware may be a standard IP which is developed according to the USB standard and may be implemented to include a USB controller, a USB PHY, and the small amount of memory. The USB hardware thus implemented may be embedded and used in various chips.

According to an embodiment, the USB hardware interface 115 may transmit not USB data, which complies with the USB standard, but video data (i.e., non-USB data) to an external device of the AP 110. That is, the USB hardware interface 115 may transmit video data which does not comply with the USB standard protocol (or which does not comply with the USB class standard). For example, the processor 118 may not implement a USB protocol stack (e.g., a USB class driver) for transmission of video data on software. The USB hardware interface 115 may convert data (i.e., non-USB data not provided from the USB protocol stack), which is generated according to a protocol different from a protocol of the USB standard class, into serial data complying with the USB LINK standard and PHY standard and may transmit the converted signal to an external device of the AP 110. Various embodiments of the present disclosure may include a method of processing HD video data using a path composed of the compression module 112, the encryption module 114, and the like respectively implemented with the hardware modules and transmitting the processed video data to an external device of the AP 110 through the USB hardware interface 115. Various embodiments of the present disclosure may include a method of transmitting data generated using the HDMI protocol or DP protocol to an external device of the AP 110 through the USB hardware interface 115.

According to various embodiments of the present disclosure, the USB hardware interface 115 may transmit video data (i.e., USB data) of a USB data form, which complies with the USB standard, to an external device of the AP 110. For example, the processor 118 may implement a protocol stack (e.g., a USB class driver) suitable for classes of a connected USB device on software. Various embodiments of the present disclosure may include a method of processing HD video data using a path composed of the compression module 112, the encryption module 114, and the like and transmitting the processed video data to an external device of the AP 110 through the USB hardware interface 115.

According to an embodiment, the USB controller 30 may include at least one USB 3.x (meaning a version of 3.0 or more) host controller. The USB hardware interface 115 may transmit video data using an isochronous transfer mode or a bulk transfer mode of the USB controller 30. A transfer mode of the USB controller 30 is well-known, and a description thereof is thus omitted.

According to an embodiment, the USB hardware interface 115 may transmit and receive video data, audio data, and a control signal using one USB controller 30 (e.g., a USB 3.x controller). According to an embodiment, the USB controller 30 may include a plurality of communication channels (e.g., endpoints). According to an embodiment, the USB controller 30 may transmit video data and audio data to the adapter device 200 through a plurality of communication channels (e.g., six communication channels), which are set to at least one pin (e.g., a Tx pin or an Rx pin) and may transmit and receive a control signal to and from the adapter device 200. According to an embodiment, the USB controller 30 may transmit or receive video data, audio data, and a control signal through different communication channels, respectively. For example, the USB controller 30 may transmit video data to the adapter device 200 using a first communication channel set to the Tx channel, may transmit audio data to the adapter device 200 using a second communication channel set to the Tx channel, and may receive a control signal from the adapter device 200 using a third communication channel set to the Rx channel. The USB controller 30 may transmit a control signal to the adapter device 200 using a fourth communication channel set to the Tx channel, may receive HDCP-associated data from the adapter device 200 using a fifth communication channel set to the Rx channel, and may transmit HDCP-associated data to the adapter device 200 using a sixth communication channel set to the Tx channel. According to an embodiment, the USB controller 30 may set a data transfer type (e.g., an isochronous mode or a bulk mode) for each communication channel.

According to an embodiment, the USB connector 120 may support both USB communication and non-USB communication based on a kind of connected external device. For example, in the case where an external device (e.g., a USB memory device) as a USB device is connected to the USB connector 120, the AP 110 may perform a process of connecting a USB host and a USB device and may transmit and receive USB data through the USB connector 120. As another example, in the case where not the USB device but another kind of external device (e.g., the adapter device 200) is connected to the USB connector 120, the AP 110 may perform a process for connection with a non-USB device and may transmit and receive non-USB data (i.e., data generated using a protocol different from the USB standard protocol) through the USB connector 120. According to an embodiment, the AP 110 may transmit and receive non-USB data to and from an external device of the AP 110 through the USB hardware interface 115. According to an embodiment, the USB connector 120 may form at least one contact with a connector of an external device (e.g., the adapter device 200). According to an embodiment, the USB connector 120 may transmit and receive USB data or non-USB data based on a kind of external device connected through the at least one contact. According to an embodiment, the USB connector 120 may transmit and receive USB data and non-USB data through each of a plurality of contacts. Below, an example is provided in which the USB connector 120 is used for transmission of non-USB data. This may be referred to as an alternate mode connection of the USB connector 120.

According to an embodiment, the USB connector 120 may be a USB type-C connector which is defined in the USB standard. The USB type-C connector may provide an alternate mode for connecting a non-USB device based on the standard.

According to an embodiment, if the adapter device 200 as a non-USB device is connected to the USB connector 120, the first electronic device 100 may be connected with the adapter device 200 in the alternate mode. According to an embodiment, the AP 110 may initiate an alternate mode of a connector without performing a USB enumeration process and may discover the adapter device 200. If the USB connector 120 is connected with the adapter device 200 in the alternate mode, the AP 110 may transmit video data, which does not comply with the USB standard protocol (or is not generated by the USB standard protocol), to the adapter device 200 without the USB enumeration process.

According to another embodiment, the AP 110 may perform the USB enumeration process after a connection is made in the alternate mode (or, at the same time with a process to connect in the alternate mode). The AP 110 may recognize the adapter device 200 through an enumeration process with the adapter device 200. The AP 110 may implement the USB standard protocol stack (e.g., a USB class driver) on software during the enumeration process and may transmit video data generated by the USB standard protocol stack to the adapter device 200.

According to an embodiment, the USB hardware interface 115 may transmit and receive a control signal to and from the adapter device 200 through the USB connector 120. The control signal may include at least one of hot plug detection (HPD) information, extended display identification data (VESA EDID) information, content protection associated information (e.g., information associated with HDCP or DPCP), and consumer electronics control (CEC) or RCP information. According to an embodiment, the USB hardware interface 115 may transmit and receive video data and a control signal through different contacts (or paths), respectively. For example, the USB hardware interface 115 may transmit and receive video data through a Tx or Rx pin of the USB connector 120 and a control signal through a D pin or an SBU pin of the USB connector 120. According to another embodiment, the USB hardware interface 115 may transmit and receive video data and a control signal through the same contact (or path). For example, the USB hardware interface 115 may transmit video data and a control signal through a Tx or Rx pin of the USB connector 120.

According to an embodiment, the wireless communication interface 116 may transmit encrypted video data and a control signal to an external device (e.g., a wireless communication interface or a wireless communication chip) of the AP 110. According to an embodiment, the wireless communication interface 116 may transmit video data generated by the AP 110 (or video data received from the encryption module 114 or the third buffer 145) to an external device of the AP 110. According to an embodiment, the wireless communication interface 116 may include a wireless gigabit (WiGig) interface, a Wi-Fi interface, a Bluetooth (BT) interface, and the like. According to an embodiment, the wireless communication module (or the wireless communication chip) may transmit video data and a control signal received from the wireless communication interface 116 to the adapter device 200.

According to an embodiment, the DMA module 117 may copy data which is stored in the buffer 141, 143, 145, or 147 of the second memory 140. According to an embodiment, if data of a specific magnitude is copied to the buffer 141, 143, 145, or 147, the DMA module 117 may generate an interrupt to be provided to the processor 118 or dedicated hardware designed to receive a DMA interrupt. The DMA module 117 may include one or more DMA modules.

The processor 118 may control operations of the AP 110 and the first electronic device 100 overall. For example, the processor 118 may control the video processing module 111, the compression module 112, the multiplexer 113, the encryption module 114, the USB hardware interface 115, the wireless communication interface 116, the DMA module 117, the USB connector 120, the first memory 130, the second memory 140, and the like such that based on various embodiments of the present disclosure, the first electronic device 100 processes video data and transmits the processed video data to the adapter device 200.

According to an embodiment, if an interrupt is generated from the DMA module 117, the processor 118 may transmit data stored in the buffer 141, 143, 145, or 147 to the compression module 112, the multiplexer 113, the encryption module 114, or the USB hardware interface 115.

According to an embodiment, the first memory 130 may be a nonvolatile memory. For example, the first memory 130 may be a flash memory. For example, the first memory 130 may include an embedded multimedia card (eMMC), a universal flash storage (UFS), or a secure digital (SD) card. According to an embodiment, the first memory 130 may store system data (e.g., an OS, a kernel, and the like), software drivers (e.g., a display driver, a USB driver, an HDCP driver, and the like), and user data (e.g., video data of a movie file).

According to an embodiment, the first memory 140 may be a nonvolatile memory. For example, the second memory 140 may be a random access memory (RAM). According to an embodiment, the second memory 140 may include the first buffer 141, the second buffer 143, the third buffer 145, and the fourth buffer 147. According to an embodiment, the first buffer 141 may store data which is generated (or of which the area is assigned) by the video processing module 111 and is then processed by the video processing module 111. For example, the first buffer 141 may be a frame buffer. According to an embodiment, video data stored in the first buffer 141 may be provided to the compression module 112 or the encryption module 114. According to an embodiment, the second buffer 143 may store video data which is compressed by the compression module 112. According to an embodiment, video data stored in the second buffer 143 may be provided to the encryption module 114. According to an embodiment, the third buffer 145 may store video data which is encrypted by the encryption module 114. According to various embodiments, video data stored in the third buffer 145 may be provided to the USB hardware interface 115 or the wireless communication interface 116.

According to an embodiment, the fourth buffer 147 may store audio data which is associated with video data. According to an embodiment, audio data stored in the fourth buffer 147 may be provided to the multiplexer 113.

According to an embodiment, at least a portion of the first buffer 141, the second buffer 142, the third buffer 145, and the fourth buffer 147 may not be included in the first electronic device 100. For example, video data may be transmitted through a dedicated data path (or a hardware signal line) to connect the first buffer 141, the compression module 112, the encryption module 114, and the USB hardware interface 114. That is, video data stored in the first buffer 141 may be transmitted to the USB hardware interface 114 without passing through any other buffer(s) except the first buffer 141. As another example, video data may be transmitted through a dedicated data path (or a hardware signal line) to connect the video processing module 111, the compression module 112, the encryption module 114, and the USB hardware interface 114. As at least a portion of the first buffer 141, the second buffer 143, and the third buffer 145 is omitted (is not included), intervention of software and the traffic of the second memory 140 may be minimized.

According to an embodiment, video data stored in the first buffer 141 may be divided by a specific unit and may be transmitted to the encryption module 200 along the data path. For example, video data stored in the first buffer 141 may be transmitted to the adapter device 200 through the USB hardware interface 150 by a unit corresponding to one-fourth times or one-eighth times the size of the first buffer 141.

In FIG. 2, an embodiment of the present disclosure is exemplified in which the second memory 140 is placed outside the AP 110. However, the scope and spirit of the present disclosure may not be limited thereto. For example, at least a portion (e.g., all or a portion) of the second memory 140 may be placed inside the AP 110.

Figure 3:
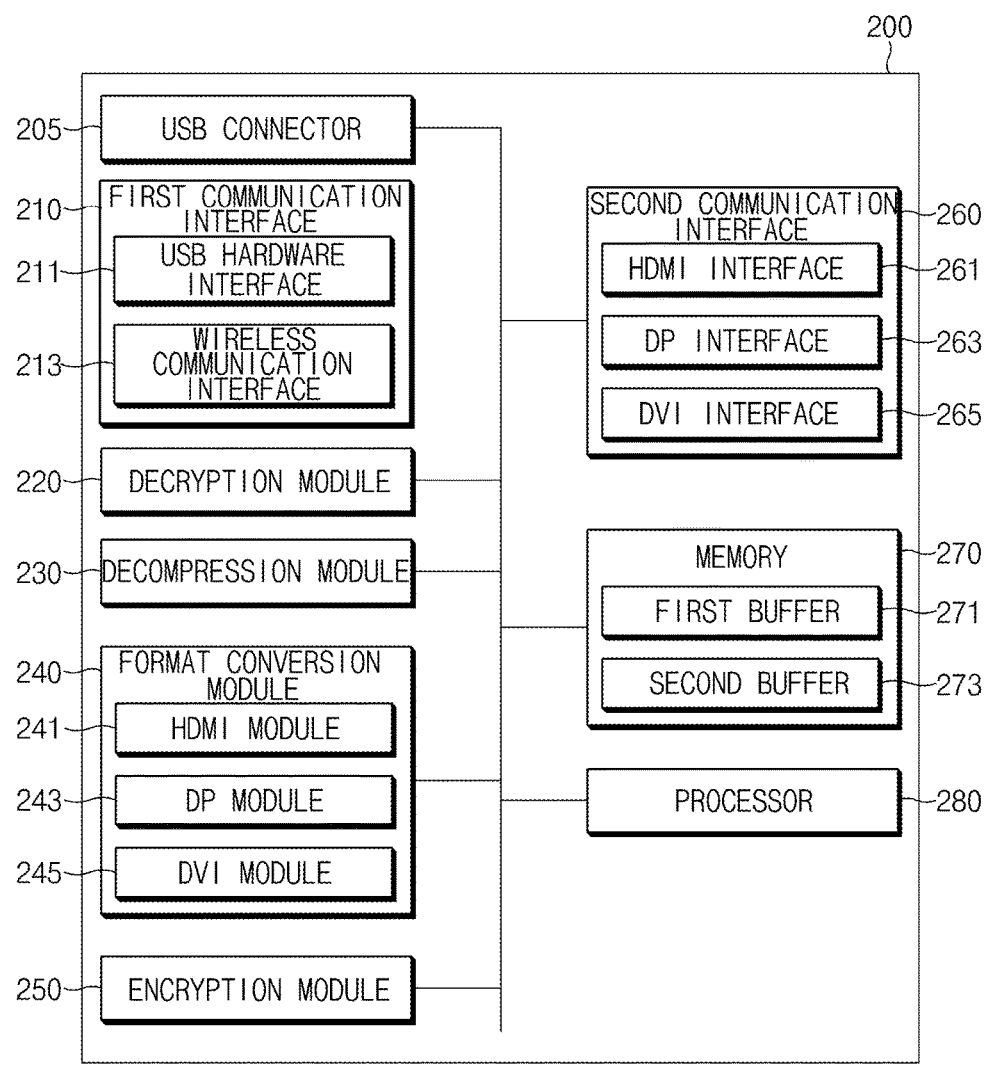
FIG. 3 is a block diagram illustrating a configuration of an adapter device according to various embodiments of the present disclosure.

FIG. 3 is a block diagram illustrating a configuration of an adapter device according to various embodiments of the present disclosure.

Referring to FIG. 3, the adapter device 200 may include a USB connector 205, a first communication interface 210, a decryption module 220, a decompression module 230, a format conversion module 240, an encryption module 250, a second communication interface 260, a memory 270, and a processor 280.

According to an embodiment, the first communication interface 210 may transmit and receive video data and a control signal to and from the first electronic device 100. According to an embodiment, the first communication interface 210 may include at least one of a USB hardware interface 211 and a wireless communication interface 213.

The USB connector 205 may be connected with the USB connector 120 included in the first electronic device 100. If connected with the USB connector 120 included in the first electronic device 100, the USB connector 205 may receive video data from the first electronic device 100 in an alternate mode.

According to an embodiment, the USB hardware interface 211 may be connected with the first electronic device 100 through the USB connector 205. According to an embodiment, the USB hardware interface 211 may not receive USB data, which complies with the USB standard, but video data (i.e., non-USB data) from the first electronic device 100. That is, the USB hardware interface 211 may receive video data which does not comply with the USB standard protocol (or which does not comply with the USB class standard). According to an embodiment, the USB hardware interface 211 may transmit and receive a control signal to and from the first electronic device 100 through the USB connector 205. The control signal may include at least one of HPD information, VESA EDID information, content protection associated information (e.g., information associated with HDCP or DPCP), and CEC or RCP information. According to an embodiment, the USB hardware interface 211 may transmit and receive video data and a control signal through different contacts (or paths), respectively. For example, the USB hardware interface 211 may transmit and receive video data through a Tx or Rx pin of the USB connector 205 and a control signal through a D pin or a SBU pin of the USB connector 205. According to another embodiment, the USB hardware interface 211 may transmit and receive video data and a control signal through the same contact (or path). For example, the USB hardware interface 211 may transmit video data and a control signal through a Tx or Rx pin of the USB connector 205.

According to an embodiment, the wireless communication interface 213 may be wirelessly connected with the first electronic device 100 through a wireless communication module (not shown) (e.g., a WiGig module, a Wi-Fi module, a BT module, or the like). According to an embodiment, the wireless communication interface 213 may receive video data from the first electronic device 100. According to an embodiment, the wireless communication interface 213 may include the WiGig interface, the Wi-Fi interface, the BT interface, and the like. According to an embodiment, the wireless communication interface 213 may transmit and receive a control signal to and from the first electronic device 100.

According to an embodiment, the decryption module 220 may decrypt video data provided to the first communication interface 210. According to an embodiment, the decryption module 220 may perform a decryption process which corresponds to an encryption process performed on the encryption module 114 of the first electronic device 100. According to various embodiments, the video data decrypted by the decryption module 220 may be provided to the decompression module 230 or a first buffer 271.

According to an embodiment, the decompression module 230 may decompress video data which is decrypted by the decryption module 220. According to an embodiment, the decompression module 230 may perform a decompression process which corresponds to a compression process performed on the compression module 112 of the first electronic device 100. According to various embodiments, the video data decompressed by the decompression module 230 may be provided to the format conversion module 240 or a second buffer 273.

According to an embodiment, the format conversion module 240 may convert the format of video data which is decompressed by the decompression module 230. According to an embodiment, the format conversion module 240 may include an HDMI module 241, a DP module 243, a digital video/visual interactive (DVI) module 245, and the like. In FIG. 3, an embodiment of the present disclosure is exemplified as the format conversion module 240 includes the HDMI module 241, the DP module 243, and the DVI module 245. However, the scope and spirit of the present disclosure may not be limited thereto. For example, the format conversion module 240 may convert video data into various video formats which are generated according to the development of technologies. According to an embodiment, the format conversion module 240 may convert decompressed video data so as to have a video format corresponding to a kind of the second communication interface 260 which is connected with the second electronic device 300. For example, if the adapter device 200 is connected with the second electronic device 300 through an HDMI interface 261, the HDMI module 241 may perform HDMI encoding about decompressed video data so as to be converted into an HDMI signal. As another example, if the adapter device 200 is connected with the second electronic device 300 through a DP interface 263, the DP module 243 may convert decompressed video data into a DP signal. According to an embodiment, video data of which the format is converted by the format conversion module 240 may be provided to the encryption module 250.

According to an embodiment, the encryption module 250 may encrypt video data received from the format conversion module 240. According to an embodiment, the encryption module 250 may include at least one of an HDCP module or a DPCP module. According to an embodiment, the encryption module 250 may encrypt video data using a module suitable for a format of video data. According to an embodiment, if video data is an HDMI signal or a DVI signal, the encryption module 250 may encrypt video data using an HDCP module. According to an embodiment, if video data is a DP signal, the encryption module 250 may encrypt video data using the HDCP module or a DPCP module. The encryption module 250 may be implemented with software or hardware.

According to an embodiment, the second communication interface 260 may transmit and receive video data and a control signal to and from the second electronic device 300. According to an embodiment, the second communication interface 260 may transmit video data, which is encrypted by the encryption module 250, to the second electronic device 300. According to an embodiment, the second communication interface 260 may include at least one of the HDMI interface 261, the DP interface 263, and a DVI interface 265.

According to an embodiment, the HDMI interface 261 may include an HDMI connector which is able to be connected with the second electronic device 300. According to an embodiment, if the HDMI connector is connected to an HDMI connector included in the second electronic device 300, the HDMI interface 261 may transmit encrypted video data to the second electronic device 300 based on the HDMI transmission standard. According to an embodiment, the HDMI interface 261 may transmit and receive a control signal to and from the second electronic device 300. The control signal may include at least one of EDID information, HDCP information, and CEC information.

According to an embodiment, the DP interface 263 may include a DP connector which is able to be connected with the second electronic device 300. According to an embodiment, if the DP connector is connected to a DP connector included in the second electronic device 300, the DP interface 263 may transmit encrypted video data to the second electronic device 300 based on the DP transmission standard. According to an embodiment, the DP interface 263 may transmit and receive a control signal to and from the second electronic device 300. The control signal may include at least one of EDID information, HDCP information, and CEC information.

According to an embodiment, the DVI interface 265 may include a DVI connector which is able to be connected with the second electronic device 300. According to an embodiment, if the DVI connector is connected to a DVI connector included in the second electronic device 300, the DVI interface 265 may transmit encrypted video data to the second electronic device 300 based on the DVI transmission standard. According to an embodiment, the DVI interface 265 may transmit and receive a control signal to and from the second electronic device 300. The control signal may include at least one of EDID information, HDCP information, and CEC information.

According to an embodiment, the memory 270 may be a volatile memory. For example, the memory 270 may be a RAM. According to an embodiment, the memory 270 may include the first buffer 271 and the second buffer 273. According to an embodiment, the first buffer 271 and the second buffer 273 may be buffers included in different memories in hardware, respectively. According to an embodiment, the first buffer 271 and the second buffer 273 may be first in first out (FIFO) buffers, respectively. According to an embodiment, the first buffer 271 may store video data which is decrypted by the encryption module 220, and the decrypted video data may be provided to the decompression module 230. According to an embodiment, the second buffer 273 may store video data which is decompressed by the decompression module 230, and the decompressed video data may be provided to the format conversion module 240. According to an embodiment, video data stored in the first buffer 271 and the second buffer 273 may be provided to a next-stage module by the processor 280 or dedicated hardware.

The processor 280 may control an overall operation of the electronic device 200. For example, the processor 280 may control the first communication module 210, the decryption module 220, the decompression module 230, the format conversion module 240, the encryption module 250, the second communication module 260, the memory 270, and the like such that, based on various embodiments of the present disclosure, the adapter device 200 processes video data received from the first electronic device 100 and transmits the processed video data to the second electronic device 300.

According to various embodiments of the present disclosure, in the case where the adapter device 200 and the second electronic device 300 are implemented with a mechanically connected device (e.g., in the case where the adapter device 200 and the second electronic device 300 are integrated), at least a portion of the format conversion module 240 and the second communication interface 260 may be omitted (or may not be included).

Figure 4:
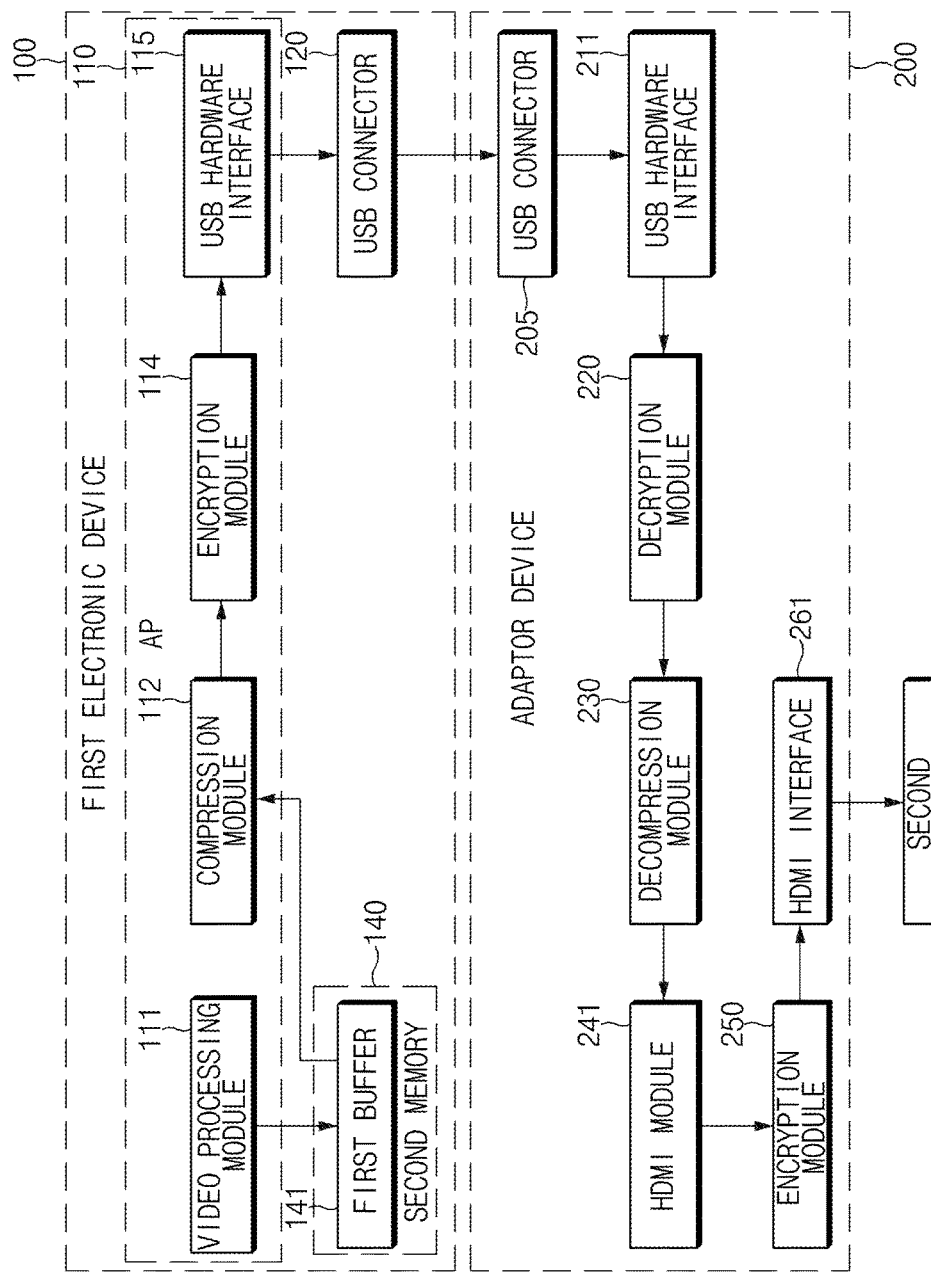
FIG. 4 is a block diagram illustrating a flow of video data according to various embodiments of the present disclosure.

FIG. 4 is a block diagram illustrating a flow of video data according to various embodiments of the present disclosure.

FIG. 4 relates to an embodiment in which the first electronic device 100 transmits video data to the adapter device 200 through the USB hardware interface 115 and the adapter device 200 transmits video data received from the first electronic device 100 to the second electronic device 300 through the HDMI interface 261.

Referring to FIG. 4, the video processing module 111 of the first electronic device 100 may process video data and may store the processed video data in the first buffer 141. According to an embodiment, the compression module 112 may compress video data received from the first buffer 141. According to an embodiment, the encryption module 114 may encrypt video data received from the compression module 112. According to an embodiment, the USB hardware interface 115 may transmit the encrypted video data received from the encryption module 114 to an external device (e.g., the USB connector 120) of the AP 110. According to an embodiment, the USB connector 120 may transmit the video data received from the USB hardware interface 115 to the USB connector 205. According to an embodiment, the USB connector 120 may transmit video data in the alternate mode for transmitting and receiving non-USB data. According to an embodiment, the compression module 112, the encryption module 114, and the USB hardware interface 115 may be connected by a hardware signal line which is placed inside the AP 110. For example, the AP 110 may include a hardware signal line, which directly connects the compression module 112 and the encryption module 114, and a hardware signal line which connects the encryption module 114 and the USB hardware interface 115. According to the above-described embodiment, the first electronic device 100 may not comply with the USB standard protocol. However, the first electronic device 100 may process HD video data using a path composed of the compression module 112 and the encryption module 114 each of which is implemented with a hardware module and may transmit the processed video data to the adapter device 200 through the USB hardware interface 115 and the USB connector 120. That is, video data stored in the first buffer 141 may be transmitted to the USB connector 120 through a dedicated data path (or a hardware signal line) to connect the compression module 112, the encryption module 114, and the USB hardware interface 115.

The USB connector 205 of the adapter device 200 may transmit video data received from the USB connector 120 of the first electronic device 100 to the USB hardware interface 211. According to an embodiment, the USB connector 205 may receive video data in the alternate mode for transmitting and receiving non-USB data. According to an embodiment, the USB hardware interface 211 may transmit video data provided to the USB connector 205 to the decryption module 220 (instead of transmitting the video data to USB SW). According to an embodiment, the decryption module 220 may decrypt video data provided to the USB hardware interface 211. According to an embodiment, the decryption module 220 may perform a decryption process which corresponds to an encryption process performed on the encryption module 114 of the first electronic device 100. According to an embodiment, the decompression module 230 may decompress video data which is decrypted by the decryption module 220. According to an embodiment, the decompression module 230 may perform a decompression process which corresponds to a compression process performed on the compression module 112 of the first electronic device 100. According to an embodiment, the HDMI module 241 may convert decompressed video data into the HDMI signal through the HDMI encoding. According to an embodiment, the encryption module 250 may encrypt video data received from the HDMI module 241. According to an embodiment, the encryption module 250 may encrypt video data received from the HDMI module 241 using an HDCP encryption manner. According to an embodiment, the HDMI interface 261 may transmit encrypted video data to the second electronic device 300 based on the HDMI transmission standard.

Figure 5:
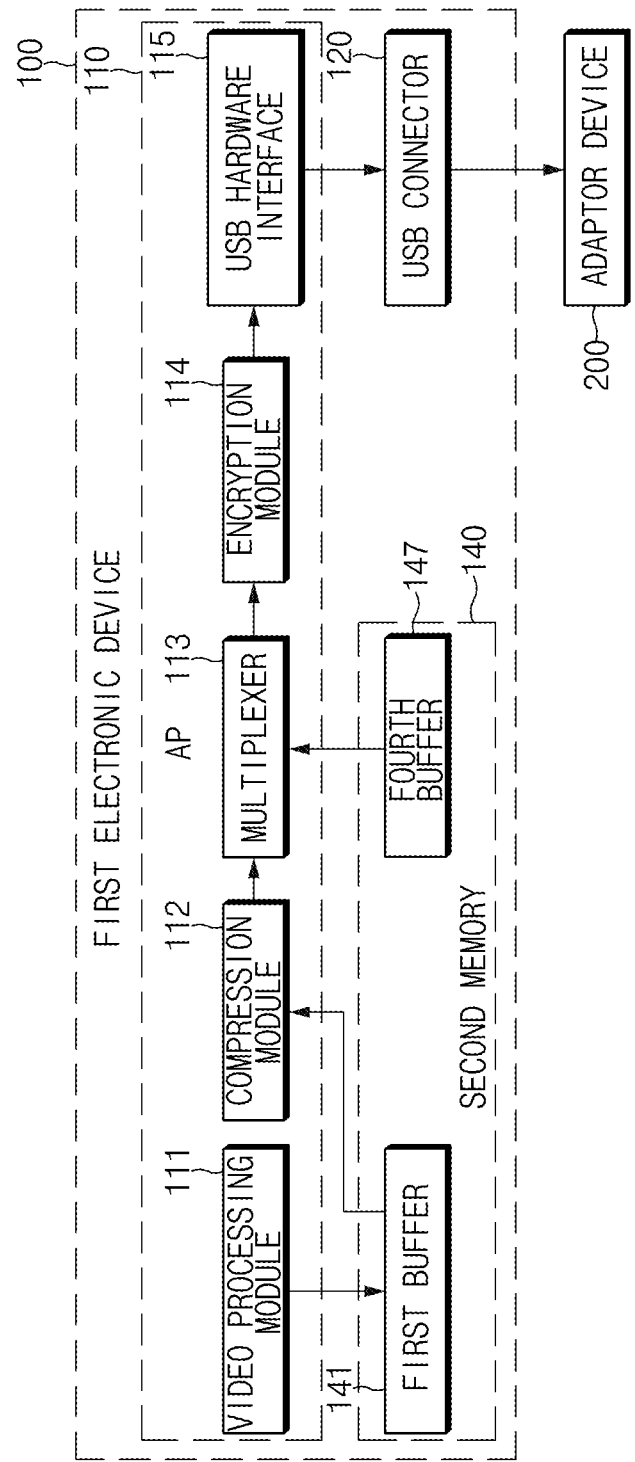
FIG. 5 is a block diagram illustrating a flow of video data of a first electronic device according to various embodiments of the present disclosure.

FIG. 5 is a block diagram illustrating a flow of video data of a first electronic device according to various embodiments of the present disclosure.

Referring to FIG. 5, the video processing module 111 of the first electronic device 100 may process video data and may store the processed video data in the first buffer 141. According to an embodiment, the compression module 112 may compress video data received from the first buffer 141. According to an embodiment, the multiplexer 113 may multiplex video data received from the compression module 112 and audio data received from the fourth buffer 147. According to an embodiment, the encryption module 114 may encrypt video data received from the multiplexer 113. According to an embodiment, the USB hardware interface 115 may transmit the encrypted video data received from the encryption module 114 to the USB connector 120. The USB connector 120 may transmit the video data received from the USB hardware interface 115 to the adapter device 200. According to an embodiment, the USB connector 120 may transmit video data in the alternate mode for transmitting and receiving non-USB data. According to an embodiment, the compression module 112, the multiplexer 113, the encryption module 114, and the USB hardware interface 115 may be connected by a hardware signal line which is placed inside the AP 110. For example, the AP 110 may include a hardware signal line, which directly connects the compression module 112 and the multiplexer 113, a hardware signal line, which directly connects the multiplexer 113 and the encryption module 114, and a hardware signal line which connects the encryption module 114 and the USB hardware interface 115. According to the above-described embodiment, the first electronic device 100 may not comply with the USB standard protocol. However, the first electronic device 100 may process HD video data using a path composed of the compression module 112, the multiplexer 113, and the encryption module 114 each of which is implemented with a hardware module and may transmit the processed video data to the adapter device 200 through the USB hardware interface 115 and the USB connector 120. That is, video data stored in the first buffer 141 may be transmitted to the USB connector 200 through a dedicated data path (or a hardware signal line) to connect the compression module 112, the multiplexer 113, the encryption module 114, and the USB hardware interface 115.

Figure 6:
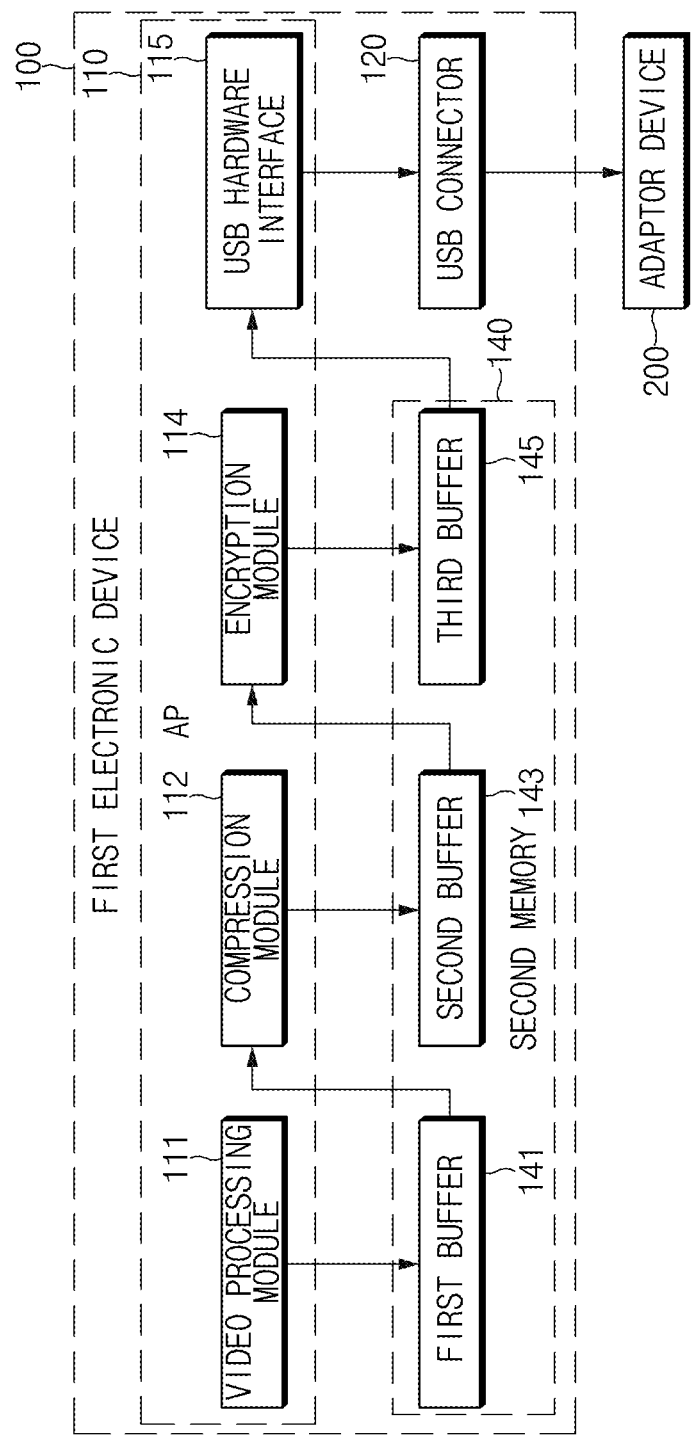
FIG. 6 is a block diagram illustrating a flow of video data of a first electronic device according to various embodiments of the present disclosure.

FIG. 6 is a block diagram illustrating a flow of video data of a first electronic device according to various embodiments of the present disclosure.

Referring to FIG. 6, the video processing module 111 of the first electronic device 100 may process video data and may store the processed video data in the first buffer 141. According to an embodiment, the compression module 112 may compress video data received from the first buffer 141. According to an embodiment, the video data which is compressed by the compression module 112 may be stored in the second buffer 143. According to an embodiment, the DMA module 117 may copy the video data, which is compressed by the compression module 112, to the second buffer 143. According to an embodiment, if video data of a specific magnitude is copied to the second buffer 143, the DMA module 117 may generate an interrupt. According to an embodiment, if an interrupt is generated by the DMA module 117, video data stored in the second buffer 143 may be provided to the encryption module 114. According to an embodiment, the encryption module 114 may encrypt video data received from the second buffer 143. According to an embodiment, video data which is encrypted by the encryption module 114 may be stored in the third buffer 145. According to various embodiments, video data stored in the third buffer 145 may be provided to the USB hardware interface 115. According to an embodiment, the USB hardware interface 115 may transmit encrypted video data received from the third buffer 145 to the USB connector 120. The USB connector 120 may transmit video data received from the USB hardware interface 115 to the adapter device 200. According to an embodiment, the USB connector 120 may transmit video data in the alternate mode for transmitting and receiving non-USB data.

Figure 7:
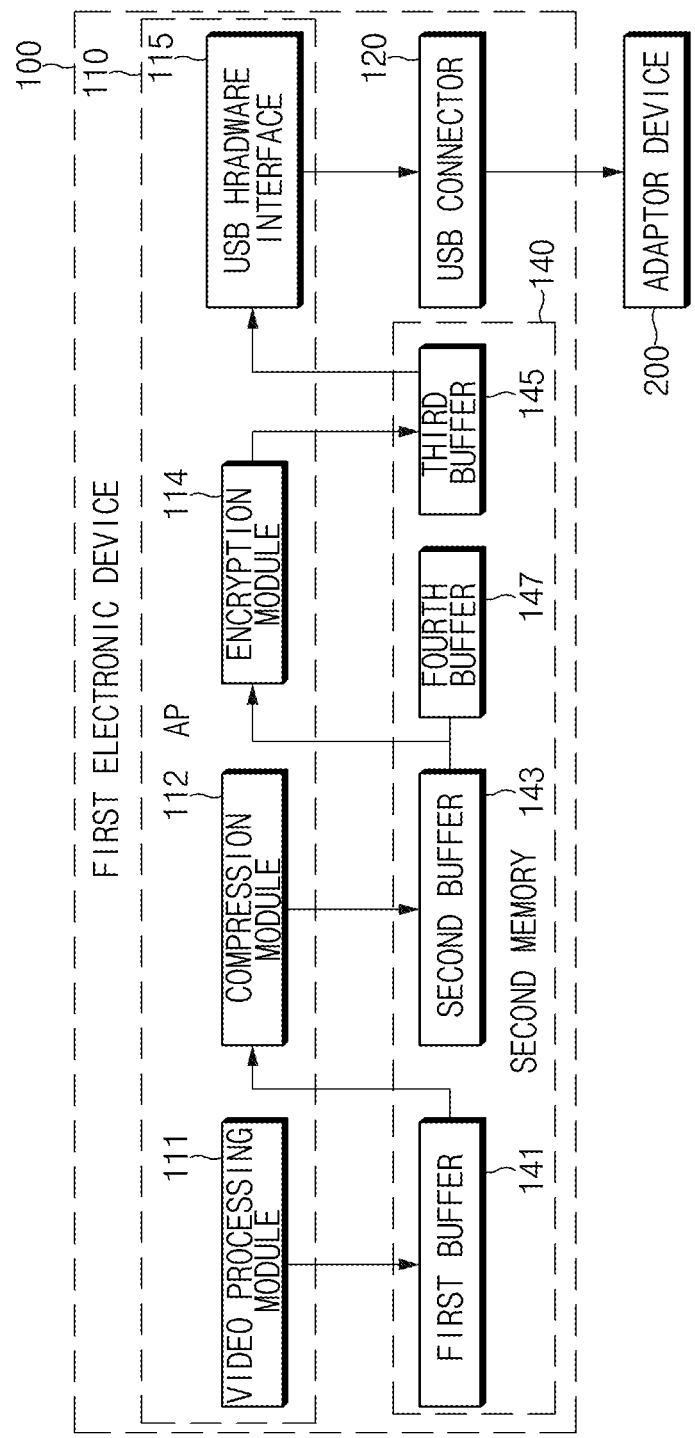
FIG. 7 is a block diagram illustrating a flow of video data of a first electronic device according to various embodiments of the present disclosure.

FIG. 7 is a block diagram illustrating a flow of video data of a first electronic device according to various embodiments of the present disclosure.

Referring to FIG. 7, the video processing module 111 of the first electronic device 100 may process video data and may store the processed video data in the first buffer 141. According to an embodiment, the compression module 112 may compress video data received from the first buffer 141. According to an embodiment, the video data which is compressed by the compression module 112 may be stored in the second buffer 143. According to an embodiment, the DMA module 117 may copy the video data, which is compressed by the compression module 112, to the second buffer 143. According to an embodiment, if video data of a specific magnitude is copied to the second buffer 143, the DMA module 117 may generate an interrupt. According to an embodiment, if an interrupt is generated by the DMA module 117, video data stored in the second buffer 143 may be provided to the encryption module 114. According to an embodiment, video data stored in the second buffer 143 may be multiplexed with audio data stored in the fourth buffer 147, and the multiplexed result may be provided to the encryption module 114. According to various embodiments, video data and audio data may be multiplexed by a software module or a hardware module. According to an embodiment, the encryption module 114 may encrypt the multiplexed video data. According to an embodiment, the video data which is encrypted by the encryption module 114 may be stored in the third buffer 145. According to an embodiment, video data stored in the third buffer 145 may be provided to the USB hardware interface 115. According to an embodiment, the USB hardware interface 115 may transmit encrypted video data received from the third buffer 145 to the USB connector 120. The USB connector 120 may transmit video data received from the USB hardware interface 115 to the adapter device 200. According to an embodiment, the USB connector 120 may transmit video data in the alternate mode for transmitting and receiving non-USB data.

Figure 8:
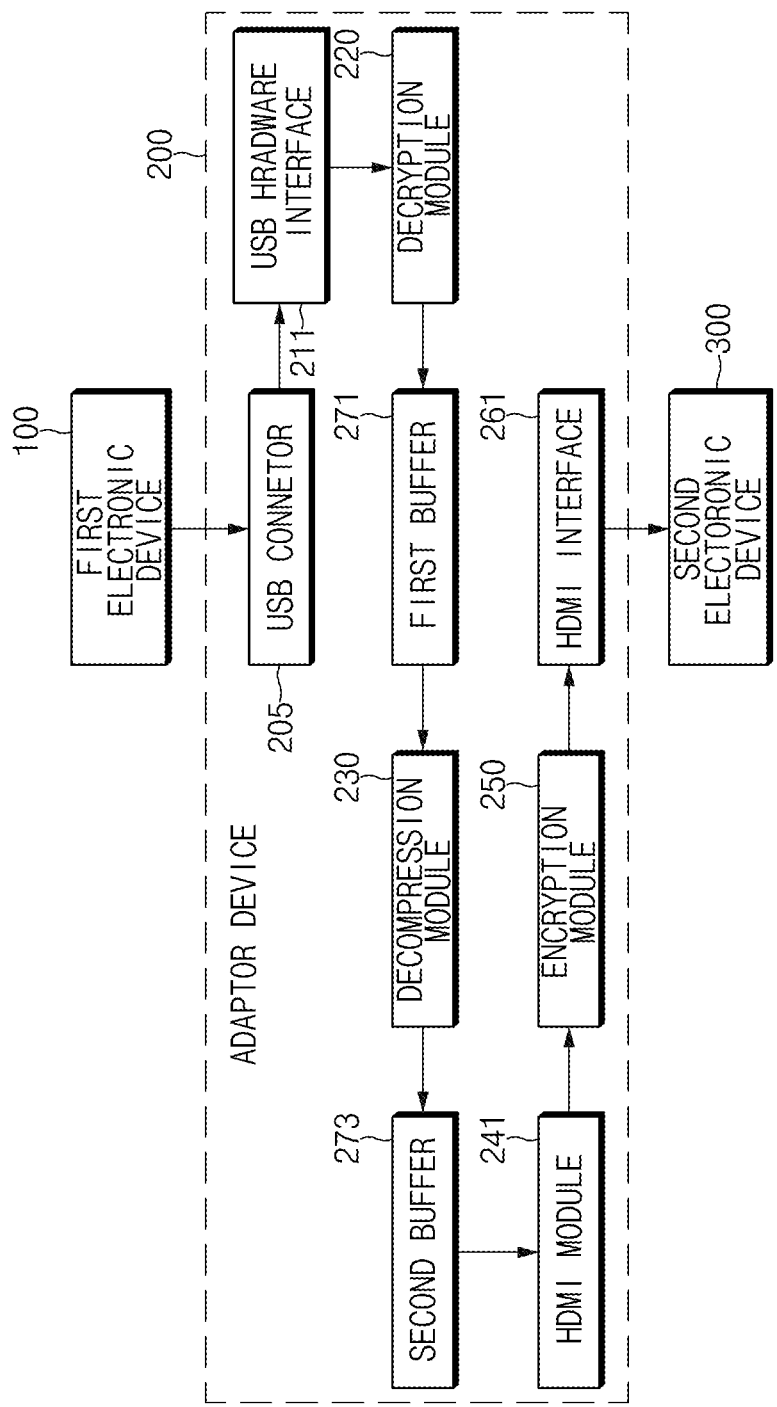
FIG. 8 is a block diagram illustrating a flow of video data of an adapter device according to various embodiments of the present disclosure.

FIG. 8 is a block diagram illustrating a flow of video data of an adapter device according to various embodiments of the present disclosure.

Referring to FIG. 8, the USB connector 205 of the adapter device 200 may transmit video data received from the first electronic device 100 to the USB hardware interface 211. According to an embodiment, the USB connector 205 may receive video data in the alternate mode for transmitting and receiving non-USB data. According to an embodiment, the decryption module 220 may decrypt video data provided to the USB hardware interface 211. According to an embodiment, the decryption module 220 may perform a decryption process which corresponds to an encryption process performed on the encryption module 114 of the first electronic device 100. According to an embodiment, the first buffer 271 may store the video data which is decrypted by the decryption module 220. According to an embodiment, the first buffer 271 may be the FIFO buffer. According to an embodiment, the first buffer 271 may be a line buffer of which the magnitude corresponds to an encryption unit of the decryption module 220. According to an embodiment, the decompression module 230 may decompress video data received from the first buffer 271. According to an embodiment, the decompression module 230 may perform a decompression process which corresponds to a compression process performed on the compression module 112 of the first electronic device 100. According to an embodiment, the second buffer 273 may store video data which is decompressed by the decompression module 230. According to an embodiment, the second buffer 273 may be the FIFO buffer. According to an embodiment, the second buffer 273 may be a line buffer of which the magnitude corresponds to an encryption unit of the decryption module 230. According to an embodiment, the HDMI module 241 may convert video data received from the second buffer 273 into the HDMI signal through the HDMI encoding. According to an embodiment, the encryption module 250 may encrypt video data received from the HDMI module 241. According to an embodiment, the encryption module 250 may encrypt video data received from the HDMI module 241 using an HDCP encryption manner. According to an embodiment, the HDMI interface 261 may transmit the encrypted video data to the second electronic device 300 based on the HDMI transmission standard.

Figure 9A:
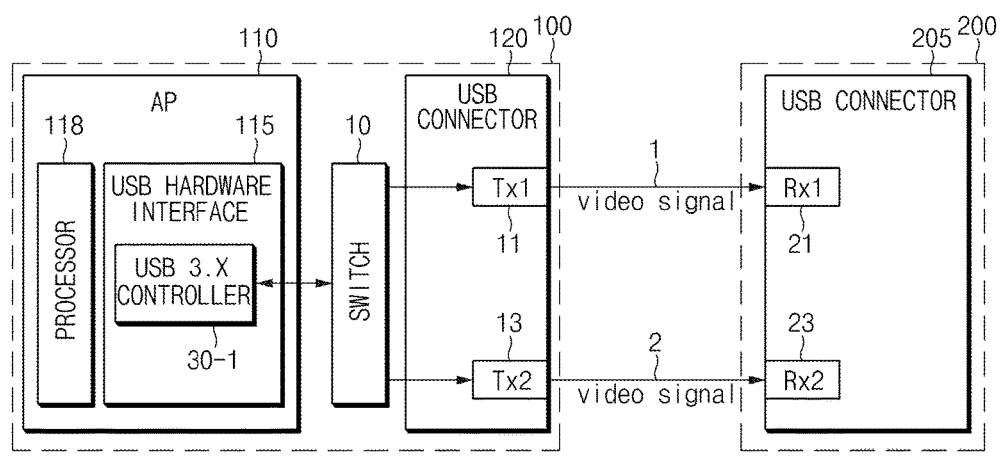
FIGS. 9A and 9B are block diagrams illustrating a video data transmission path according to various embodiments of the present disclosure.
Figure 9B:
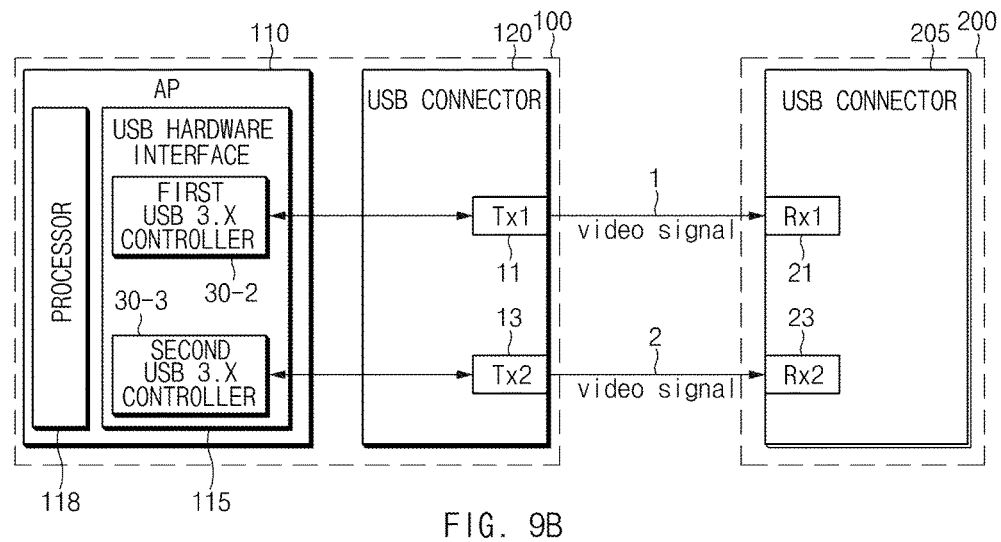

FIGS. 9A and 9B are block diagrams illustrating a video data transmission path according to various embodiments of the present disclosure.

According to an embodiment, the first electronic device 100 may transmit video data through a pin set for transmitting video data in an alternate mode of the USB connector 120. According to an embodiment, the USB connector 120 may be a USB type-C connector. According to an embodiment, the USB type-C connector may include a plurality of Tx pins (e.g., a Tx1 pin 11 and a Tx2 pin 13). The Tx pins 11 and 13 of the USB connector 120 of the first electronic device 100 may be respectively connected with a plurality of Rx pins (e.g., an Rx1 pin 21 and an Rx2 pin 23) of the USB connector 205 of the adapter device 200 and may form a contact (or a path) capable of transmitting video data. For example, the Tx1 pin 11 may make contact with the Rx1 pin 21 to form a first path 1, and the Tx2 pin 13 may make contact with the Rx2 pin 23 to form a second path 2. According to an embodiment, the processor 118 may set a pin (e.g., a Tx pin) for transmitting video data in an alternate mode of the USB type-C connector. According to an embodiment, the processor 118 may set an Rx pin for transmitting video data in the alternate mode of the USB type-C connector and may form a path. For example, the Rx1 pin of the USB connector 120 of the first electronic device 100 may make contact with the Tx1 pin of the USB connector 205 of the adapter device 200 to form the first path 1, and the Rx2 pin of the USB connector 120 of the first electronic device 100 may make contact with the Tx2 pin of the USB connector 205 of the adapter device 200 to form the second path 2.

Referring to FIG. 9A, if the USB connector 205 of the adapter device 200 is connected to the USB connector 120 of the first electronic device 100, the processor 118 may activate a USB controller (e.g., a USB 3.x controller 30-1) and may control an operation of the USB hardware interface 115. According to an embodiment, the USB hardware interface 115 may transmit video data through one of the first path 1 and the second path 2. According to an embodiment, the processor 118 may select one of two Tx pins 11 and 13 using a switch 10 and may transmit video data through the selected Tx pin. A Tx pin to transmit video data may be determined according to an insertion direction of the Tx pin.

Referring to FIG. 9B, if the USB connector 205 of the adapter device 200 is connected to the USB connector 120 of the first electronic device 100, the processor 118 may activate a plurality of USB controllers (e.g., USB 3.x controllers 30-2 and 30-3) and may control an operation of the USB hardware interface 115. For example, the first USB 3.x controller 30-2 may control the transmission of video data through the Tx1 pin 11 (or an Rx1 pin 21), and the second USB 3.x controller 30-3 may control the transmission of video data through the Tx2 pin 13 (or an Rx2 pin 23). According to an embodiment, the USB hardware interface 115 may transmit video data through the first path 1 and the second path 2 at the same time. According to an embodiment, the processor 118 may distribute and transmit video data to the first path 1 and the second path 2 based on a specific rule. For example, the processor 118 may transmit odd-numbered frames of video data through the first path 1 and may transmit even-numbered frames of the video data through the second path 2. According to an embodiment, the processor 118 may determine whether to transmit video data through one path or through a plurality of paths, based on the magnitude (or a resolution or a frame per second (FPS)) of video data to be sent to the adapter device 200. For example, in the case where the resolution of video data is smaller than a specific resolution, the video data may be transmitted through one path. In the case where the resolution of video data is greater than or equal to the specific resolution, the video data may be transmitted through a plurality of paths. An embodiment of the present disclosure is exemplified as an operation, in which the processor 118 distributes video data based on a specific rule, that is performed by the processor 118. However, the scope and spirit of the present disclosure may not be limited thereto. For example, the AP 110 may include a separate hardware module dedicated for processing the distribution of video data.

Figure 10A:
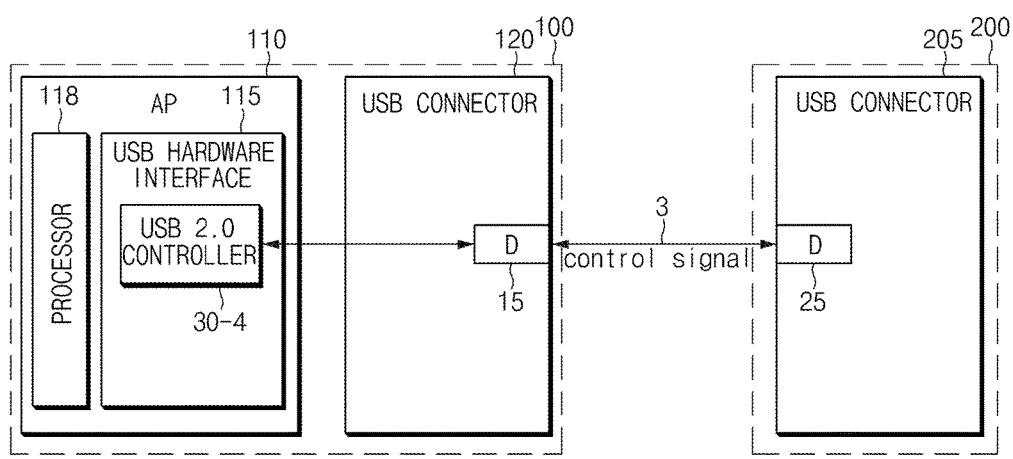
FIGS. 10A and 10B are block diagrams illustrating a control signal transmission path according to various embodiments of the present disclosure.
Figure 10B:
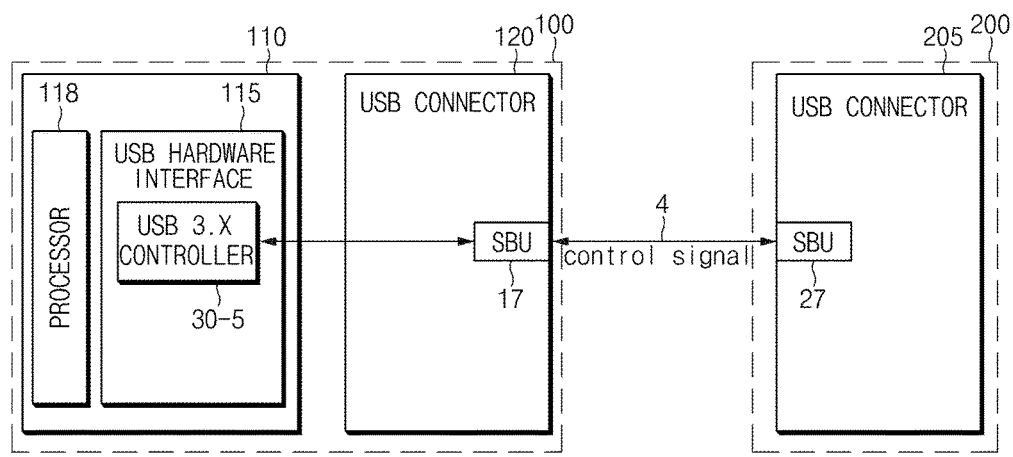

FIGS. 10A and 10B are block diagrams illustrating a control signal transmission path according to various embodiments of the present disclosure.

According to various embodiments, the first electronic device 100 may transmit a control signal through a pin (e.g., a D pin or a SUB pin) of the USB connector 120 that is set to transmit a control signal.

Referring to FIG. 10A, the first electronic device 100 may transmit and receive a control signal through the D pin 15 (it may be a D+ or D− pin of a USB connector as a data pin) of the USB connector 120. According to an embodiment, the USB connector 120 may be a USB type-C connector. According to an embodiment, the D pin 15 of the USB connector 120 of the first electronic device 100 may make contact with a D pin 25 of the USB connector 205 of the adapter device 200 and may form a path 3 capable of transmitting and receiving a control signal. According to an embodiment, if the USB connector 205 of the adapter device 200 is connected to the USB connector 200, the processor 118 may activate a USB 2.0 controller 30-4 included in the USB hardware interface 115 and may control the transmit and receive of a control signal through the D pin 15. According to an embodiment, in the case where the control signal is sent and received through the D pin 15, it may be sent and received as USB data which complies with the USB 2.0 standard. That is, the first electronic device 100 may discover and recognize the adapter device 200 as a USB device through a USB enumeration process independently of the transmission of video data and may transmit a control signal through a USB standard communication interface.

Referring to FIG. 10B, the first electronic device 100 may transmit a control signal through the SUB pin 17 in an alternate mode of the USB connector 120. According to an embodiment, the USB connector 120 may be a USB type-C connector. According to an embodiment, the SUB pin 17 of the USB connector 120 of the first electronic device 100 may make contact with a SUB pin 27 of the USB connector 205 of the adapter device 200 and may form a path 4 capable of transmitting and receiving a control signal. According to an embodiment, if the USB connector 205 of the adapter device 200 is connected to the USB connector 200, the processor 118 may activate a communication interface controller (e.g., a USB 3.x controller 30-5, a universal asynchronous receiver/transmitter (UART), a serial peripheral interface (SPI), or the like) and may control the transmit and receive of a control signal through the SUB pin 17.

According to various embodiments, the first electronic device 100 may transmit and receive a control signal through a Tx pin or an Rx pin of a connector included in the USB connector 120. For example, video data and a control signal may be transmitted or received through one pin. In the case where the first electronic device 100 transmits a control signal through a Tx pin or a Rx pin, a period in which a control signal is transmitted may be inserted in the middle of a period in which video data is transmitted FIG. 11 is a flowchart illustrating a process of setting an environment for transmission of video data according to various embodiments of the present disclosure.

Figure 11:
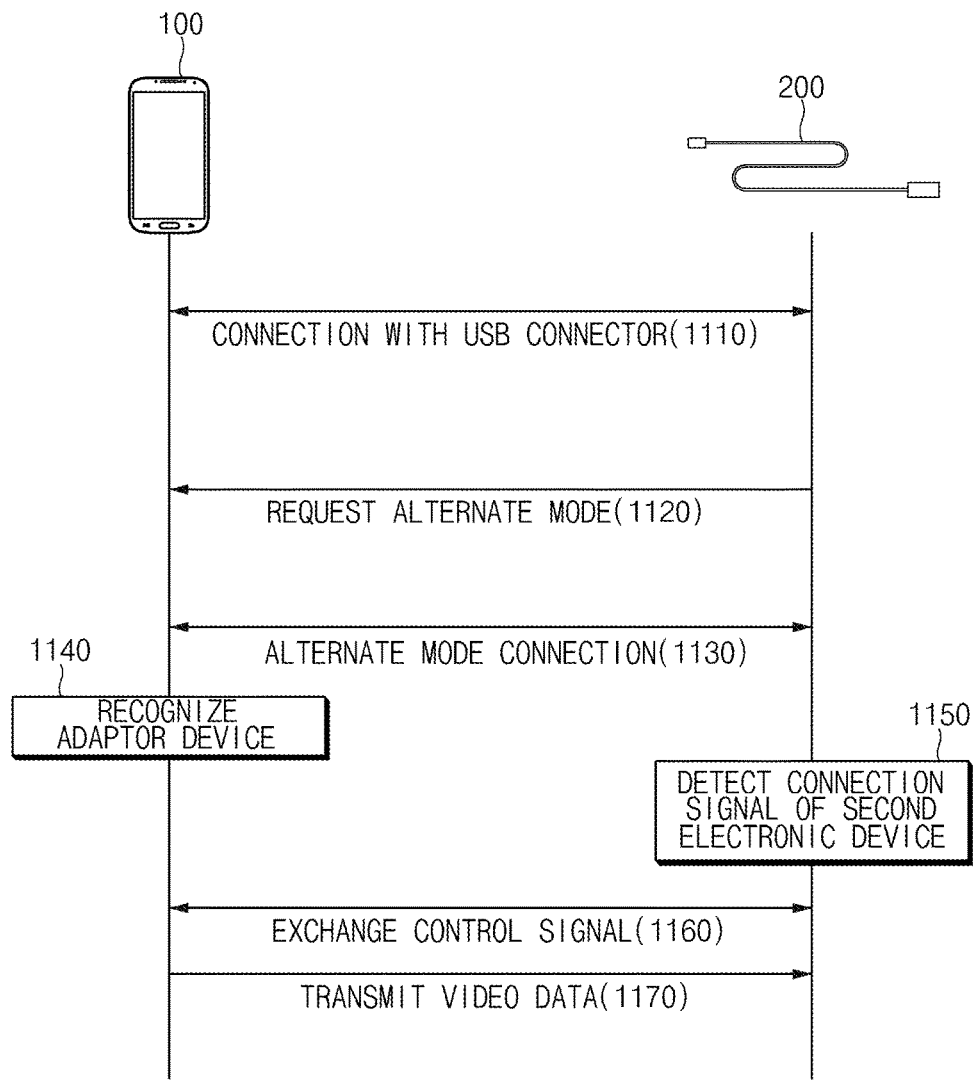
FIG. 11 is a flowchart illustrating a process of setting an environment for transmission of video data according to various embodiments of the present disclosure.

Referring to FIG. 11, in operation 1110, the first electronic device 100 and the adapter device 200 may be interconnected with a USB connector. According to an embodiment, the USB connector may be a USB type-C connector.

According to an embodiment, if the USB connector is connected, in operation 1120, the adapter device 200 may request an alternate mode from the first electronic device 100. According to an embodiment, if the USB connector is connected, the first electronic device 100 and the adapter device 200 may exchange a vendor defined message (VDM) through a CC pin of the USB connector. The VDM may include, for example, a command for a mode change of the USB connector. For example, the VDM may include a command (hereinafter referred to as "alternate mode enter command") which allows the USB connector to enter the alternate mode and a command (hereinafter referred to as "alternate mode exit command") which allows the USB connector to exit from the alternate mode. That is, the adapter device 200 may transmit the VMD, which includes the alternate mode enter command, to the first electronic device 100 and may request the alternate mode connection. As another example, in the case where the USB connectors 120 and 250 are not a USB type-C connector, an opponent device may be identified by a method different from a method in which the VDM and the CC pin are used, and the first electronic device 100 and the adapter device 200 may be connected in the alternate mode. For example, the first electronic device 100 may identify the adapter device 200 based on a resistance value of a specific pin of a USB connector and may be connected with the adapter device 200 in the alternate mode based on the identification result. According to an embodiment, in operation 1130, the first electronic device 100 and the adapter device 200 may be interconnected in the alternate mode. That is, the first electronic device 100 and the adapter device 200 may set a mode of the USB connector to the alternate mode. According to an embodiment, the first electronic device 100 may receive device information of the adapter device 200 from the adapter device 200 during an alternate mode connection process. According to an embodiment, in operation 1140, the first electronic device 100 may recognize the adapter device 200. According to an embodiment, the first electronic device 100 may recognize the adapter device 200 using the device information of the adapter device 200 received during the alternate mode connection process. According to an embodiment, if the adapter device 200 is recognized, the first electronic device 100 may activate various kinds of drivers (e.g., a video processing driver, an HDCP driver, and the like) which are needed to process video data.

According to an embodiment, in operation 1150, the adapter device 200 may detect a connection signal of the second electronic device 300. For example, if the adapter device 200 and the second electronic device 300 are connected with the HDMI connector, an HPD connection signal or an HDMI_5V connection signal may be detected by the HDMI interface 261 of the adapter device 200.

According to an embodiment, operation 1150 may be performed before operation 1140. That is, an operation in which the adapter device 200 recognizes the second electronic device 300 may be performed before an operation in which the first electronic device 100 recognizes the adapter device 200.

According to an embodiment, in operation 1160, the first electronic device 100 and the adapter device 200 may exchange a control signal. For example, if receiving the connection signal of the second electronic device 300 from the adapter device 200, the first electronic device 100 may recognize that the adapter device 200 is connected with the second electronic device 300 and may exchange a control signal with the adapter device 200. According to an embodiment, the control signal may include at least one of EDID information, HDCP information, and CEC information. According to an embodiment, in the case where the first electronic device 100 transmits video data while the resolution and FPS of video data are fixed, the first electronic device 100 may not transmit the EDID to the adapter device 200.

According to an embodiment, the control signal may be exchanged through the same pin (e.g., a Tx pin or an Rx pin) as a pin through which video data is transmitted. According to an embodiment, the control signal may be exchanged as USB data, which complies with the USB 2.0 standard, through the D pin or the SUB pin of the USB connector. According to an embodiment, in the case where the control signal is transmitted and received through the D pin of the USB connector by the USB 2.0 controller, a USB 2.0 connection process may be performed independently of entering the alternate mode of the first electronic device 100. For example, if the first electronic device 100 and the adapter device 200 are connected with the USB connector, the first electronic device 100 may activate the USB 2.0 controller and may perform a USB enumeration process to recognize the adapter device 200 as a USB device.

According to an embodiment, if the control signal is exchanged, in operation 1170, the first electronic device 100 may transmit video data to the adapter device 200. According to an embodiment, the first electronic device 100 may transmit video data in the isochronous transmission mode or the bulk transmission mode that the USB hardware interface 115 provides. According to an embodiment, the first electronic device 100 may transmit video data in the alternate mode (as a non-USB device connection) through at least one or more pins of the USB connector.

Figure 12:
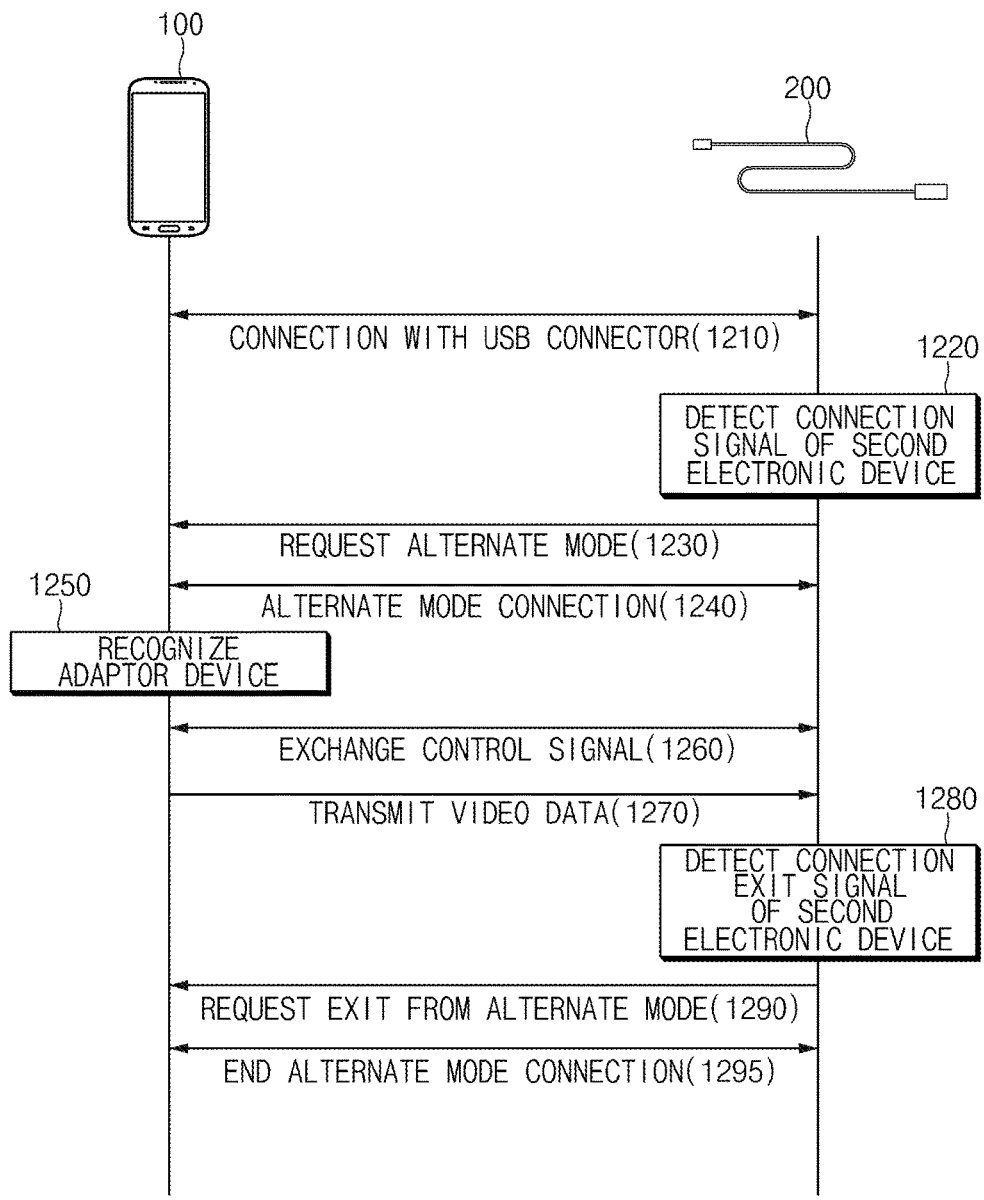
FIG. 12 is a flowchart illustrating a process of setting an environment for transmission of video data according to various embodiments of the present disclosure.

FIG. 12 is a flowchart illustrating a process of setting an environment for transmission of video data according to various embodiments of the present disclosure.

Referring to FIG. 12, in operation 1210, the first electronic device 100 and the adapter device 200 may be interconnected with a USB connector. According to an embodiment, the USB connector may be a USB type-C connector.

According to an embodiment, in operation 1220, the adapter device 200 may detect a connection signal of the second electronic device 200. For example, if the adapter device 200 and the second electronic device 300 are connected with the HDMI connector, an HPD connection signal or an HDMI_5V connection signal may be detected by the HDMI interface 261 of the adapter device 200.

According to an embodiment, if the connection signal of the second electronic device 200 is detected, in operation 1230, the adapter device 200 may request an alternate mode from the first electronic device 100. According to an embodiment, if the USB connector is connected, the first electronic device 100 and the adapter device 200 may exchange the VDM through the CC pin of the USB connector. The VDM may include, for example, a command for a mode change of the USB connector. For example, the VDM may include the alternate mode enter command and the alternate mode exit command. That is, the adapter device 200 may transmit the VMD, which includes the alternate mode enter command, to the first electronic device 100 and may request the alternate mode connection. As another example, in the case where the USB connectors 120 and 250 are not a USB type-C connector, an opponent device may be identified by a method different from a method in which the VDM and the CC pin are used, and the first electronic device 100 and the adapter device 200 may be connected in the alternate mode. For example, the first electronic device 100 may identify the adapter device 200 based on a resistance value of a specific pin of a USB connector and may be connected with the adapter device 200 in the alternate mode based on the identification result.

According to an embodiment, in operation 1240, the first electronic device 100 and the adapter device 200 may be interconnected in the alternate mode. That is, the first electronic device 100 and the adapter device 200 may set a mode of the USB connector to the alternate mode. According to an embodiment, the first electronic device 100 may receive device information of the adapter device 200 from the adapter device 200 during an alternate mode connection process.

According to an embodiment, in operation 1250, the first electronic device 100 may recognize the adapter device 200. According to an embodiment, the first electronic device 100 may recognize the adapter device 200 using the device information of the adapter device 200 received during the alternate mode connection process. According to an embodiment, if the adapter device is recognized, the first electronic device 100 may activate various kinds of drivers (e.g., a video processing driver, an HDCP driver, and the like) which are needed to process video data.

According to an embodiment, in operation 1260, the first electronic device 100 and the adapter device 200 may exchange a control signal. According to an embodiment, if entering the alternate mode, the first electronic device 100 and the adapter device 200 may exchange the control signal. According to an embodiment, the control signal may include at least one of EDID information, HDCP information, and CEC information. According to an embodiment, in the case where the first electronic device 100 transmits video data while the resolution and FPS of video data are fixed, the first electronic device 100 may not transmit the EDID to the adapter device 200.

According to an embodiment, the control signal may be exchanged through the same pin (e.g., a Tx pin or an Rx pin) as a pin through which video data is transmitted. According to an embodiment, the control signal may be exchanged through the D pin or the SUB pin of the USB connector. According to an embodiment, in the case where the control signal is transmitted and received through the D pin of the USB connector by the USB 2.0 controller, a USB 2.0 connection process may be performed independently of entering the alternate mode of the first electronic device 100. For example, if the first electronic device 100 and the adapter device 200 are connected with the USB connector, the first electronic device 100 may activate the USB 2.0 controller and may perform a USB enumeration process to recognize the adapter device 200 as a USB device.

According to an embodiment, if the control signal is exchanged, in operation 1270, the first electronic device 100 may transmit video data to the adapter device 200. According to an embodiment, the first electronic device 100 may transmit video data in the isochronous transmission mode or the bulk transmission mode that the USB hardware interface 115 provides. According to an embodiment, the first electronic device 100 may transmit video data in the alternate mode through at least one or more pins of the USB connector.

According to an embodiment, in operation 1280, the adapter device 200 may detect a connection end signal of the second electronic device 200. For example, if the adapter device 200 is detached from the HDMI connector of the second electronic device 300, an HPD connection end signal or an HDMI_5V end signal may be detected by the HDMI interface 261 of the adapter device 200.

According to an embodiment, if the connection end signal of the second electronic device 200 is detected, in operation 1290, the adapter device 200 may request the first electronic device 100 to exit from the alternate mode. According to an embodiment, the adapter device 200 may exchange the VDM through the CC pin of the USB connector (e.g., the USB type-C connector). The adapter device 200 may send the VDM, which includes the alternate mode exit command, to the first electronic device 100 and may request the first electronic device 100 to exit from the alternate mode. As another example, in the case where the USB connector is not the USB type-C connector, the first electronic device 100 and the adapter device 200 may exit from the alternate mode by a method different from a method in which the VDM is exchanged. According to an embodiment, in operation 1295, the first electronic device 100 and the adapter device 200 may exit from the alternate mode. According to an embodiment, after exiting from the alternate mode, the first electronic device 100 and the adapter device 200 may end the process of transmitting video data. For example, the first electronic device 100 may end the process of generating and processing video data to be sent to the adapter device 200.

Figure 13:
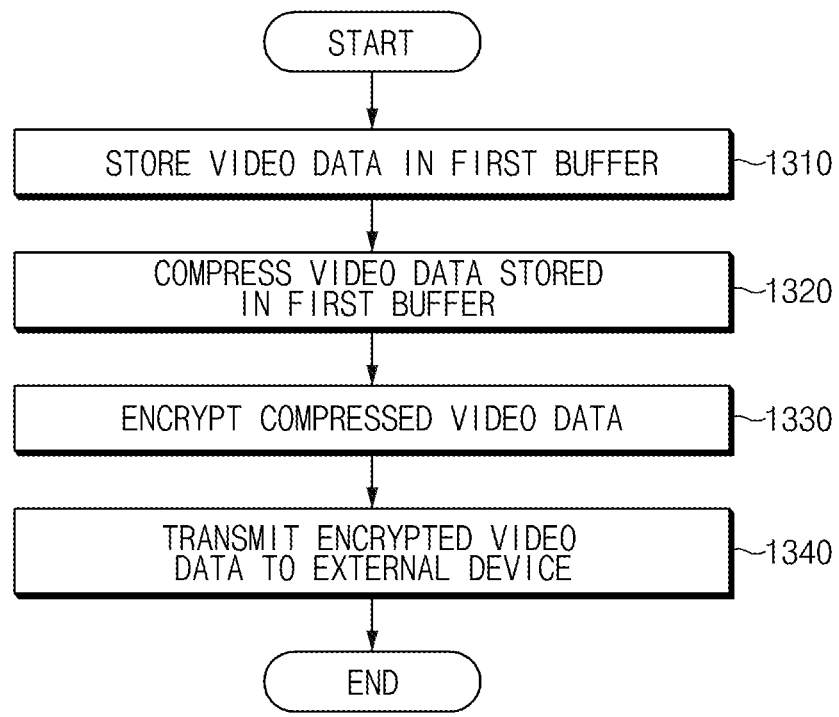
FIG. 13 is a flowchart illustrating a video data processing method of a first electronic device according to various embodiments of the present disclosure.

FIG. 13 is a flowchart illustrating a video data processing method of a first electronic device according to various embodiments of the present disclosure. The flowchart illustrated in FIG. 13 may include operations processed in the electronic device 100 shown in FIG. 2. Thus, even though omitted below, a description about the first electronic device 100 given with reference to FIG. 2 may be applied to the flowchart shown in FIG. 13.

Referring to FIG. 13, in operation 1310, the first electronic device 100 may store video data in the first buffer 141. For example, the first buffer 141 may be a frame buffer. According to an embodiment, the video processing module 111 of the first electronic device 100 may process video data stored in a memory or video data received from an external device thereof to generate video data and may store the video data in the first buffer 141.

According to an embodiment, in operation 1320, the first electronic device 100 may compress the video data stored in the first buffer 141. For example, the video data stored in the first buffer 141 may be provided to the compression module 112 so as to be compressed. The compression module 112 may compress the video data received from the first buffer 141. According to an embodiment, the compression module 112 may perform visually lossless compression in real time. The compression module 112 may be, for example, a DSC module of a VESA standard or a proprietary compression module corresponding thereto.

According to an embodiment, the first electronic device 100 may skip the compression of video data. For example, the compression module 112 may skip the video data compression process in the case where it is possible to reproduce video data, which is transmitted without compression, at the second electronic device 300 in real time (e.g., in the case where a speed in which video data is transmitted is faster than a speed in which the video data is reproduced).

According to an embodiment, in operation 1330, the first electronic device 100 may encrypt the compressed video data. For example, the video data compressed by the compression module 112 may be provided to the encryption module 114 so as to be encrypted. For example, the video data compressed by the compression module 112 may be stored in the second buffer 143 and may be provided to the encryption module 114 so as to be encrypted. According to an embodiment, the first electronic device 100 may copy video data, which is compressed by the compression module 112, to the second buffer 143 using the DMA module 117. According to an embodiment, if video data of a specific magnitude is copied to the second buffer 143, the DMA module 117 may generate an interrupt to be provided to the processor 118 (or dedicated hardware to receive an interrupt). According to an embodiment, if an interrupt is generated by the DMA module 117, video data stored in the second buffer 143 may be provided to the encryption module 114. According to an embodiment, the first electronic device 100 may encrypt video data using the HDCP module or the DPCP module.

According to an embodiment, in operation 1340, the first electronic device 100 may transmit the encrypted video data to an external device. The external device may be, for example, the adapter device 200. According to an embodiment, the first electronic device 100 may transmit video data encrypted inside the AP 110 to an external device of the AP 110 through the USB hardware interface 115. For example, the first electronic device 100 may transmit the encrypted video data to the USB connector 120 placed outside the AP 110 through the USB hardware interface 115 and may transmit the video data to the external device through the USB connector 120. According to an embodiment, the first electronic device 110 may not transmit USB data, which complies with the USB standard, but video data (i.e., non-USB data). That is, the first electronic device 100 may transmit video data which does not comply with the USB standard protocol (or which does not comply with the USB class standard). The first electronic device 100 may convert data, which is generated according to a protocol different from the USB standard protocol, into data complying with the USB LINK standard and PHY standard without intervention of the USB software protocol stack and may transmit the converted data to an external device. According to an embodiment, the first electronic device 100 may transmit video data in the isochronous transmission mode or the bulk transmission mode which the USB hardware interface 115 provides.

According to an embodiment, the first electronic device 100 may transmit video data in the alternate mode through at least one or more pins of the USB connector 120 connected with the USB hardware interface 115.

Figure 14:
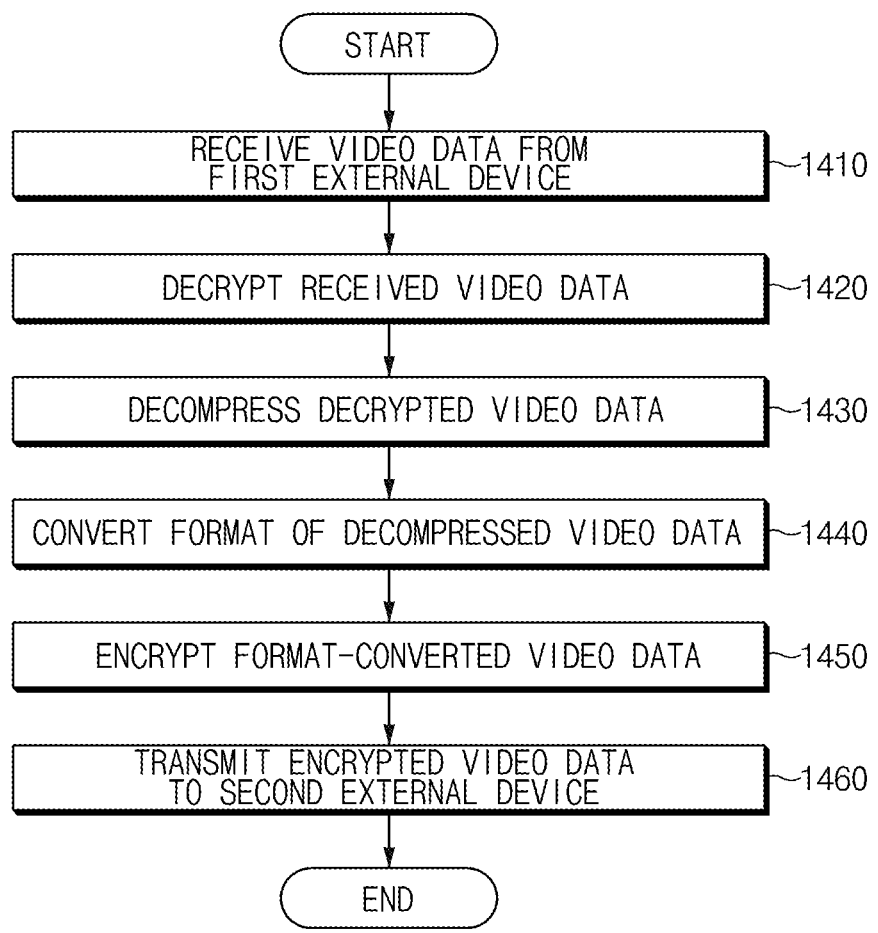
FIG. 14 is a flowchart illustrating a video data processing method of an adapter device according to various embodiments of the present disclosure.

FIG. 14 is a flowchart illustrating a video data processing method of an adapter device according to various embodiments of the present disclosure. The flowchart illustrated in FIG. 14 may include operations of the electronic device 200 illustrated in FIG. 3. Even though omitted below, the above description about the adapter device 200 illustrated in FIG. 3 may be applied to the method illustrated in FIG. 14.

Referring to FIG. 14, in operation 1410, the adapter device 200 may receive video data from a first external device. The first external device may be, for example, the first electronic device 100. According to an embodiment, the adapter device 200 may receive video data through the USB hardware interface 211 in a wired manner. According to an embodiment, the adapter device 200 may not receive USB data, which complies with the USB standard, but video data (i.e., non-USB data) from the first external device. That is, the adapter device 200 may receive video data which does not comply with the USB standard protocol (or which does not comply with the USB class standard). According to an embodiment, the adapter device 200 may receive video data in the alternate mode through at least one or more pins (e.g., a Tx pin or an Rx pin) of the USB connector 205 connected with the USB hardware interface 211.

According to an embodiment, in operation 1420, the adapter device 200 may decrypt the received video data. For example, the video data received from the first external device may be provided to the decryption module 220 so as to be decrypted. According to an embodiment, the adapter device 200 may perform a decryption process which corresponds to an encryption process performed on the first external device.

According to an embodiment, in operation 1430, the adapter device 200 may decompress the decrypted video data. For example, video data decrypted by the decryption module 220 may be provided to the decompression module 230 so as to be decompressed. As another example, video data decrypted by the decryption module 220 may be stored in the first buffer 271 and may be provided to the decompression module 230 so as to be decompressed. According to an embodiment, the first buffer 271 may be the FIFO buffer. According to an embodiment, the adapter device 200 may perform a decompression process which corresponds to a compression process performed on the first external device.

According to an embodiment, in operation 1440, the adapter device 200 may convert the format of the decompressed video data. For example, the video data decompressed by the decompression module 230 may be provided to the format conversion module 240 to allow a video format to be converted. As another example, the video data decompressed by the decompression module 230 may be stored in the second buffer 274 and may be then provided to the format conversion module 240 so as for a video format to be converted. According to an embodiment, the adapter device 200 may convert the decompressed video data into one of an HDMI signal or a DVI signal. According to an embodiment, the adapter device 200 may convert the format of decompressed video data into a video format corresponding to a kind of communication interface connected with the second electronic device 300.

According to an embodiment, in operation 1450, the adapter device 200 may encrypt the format-converted video data. For example, the video data of which the format is converted by the format conversion module 240 may be provided to the encryption module 250 so as to be encrypted. According to an embodiment, the adapter device 200 may encrypt video data using the HDCP module or the DPCP module. According to an embodiment, the adapter device 200 may encrypt video data using a manner suitable for the format of the video data.

According to an embodiment, in operation 1460, the adapter device 200 may transmit the encrypted video data to the second external device. The second external device may be, for example, the second electronic device 300. According to an embodiment, the adapter device 200 may transmit video data through one of the HDMI interface, the DP interface, or the DVI interface in a wired manner.

Figure 15:
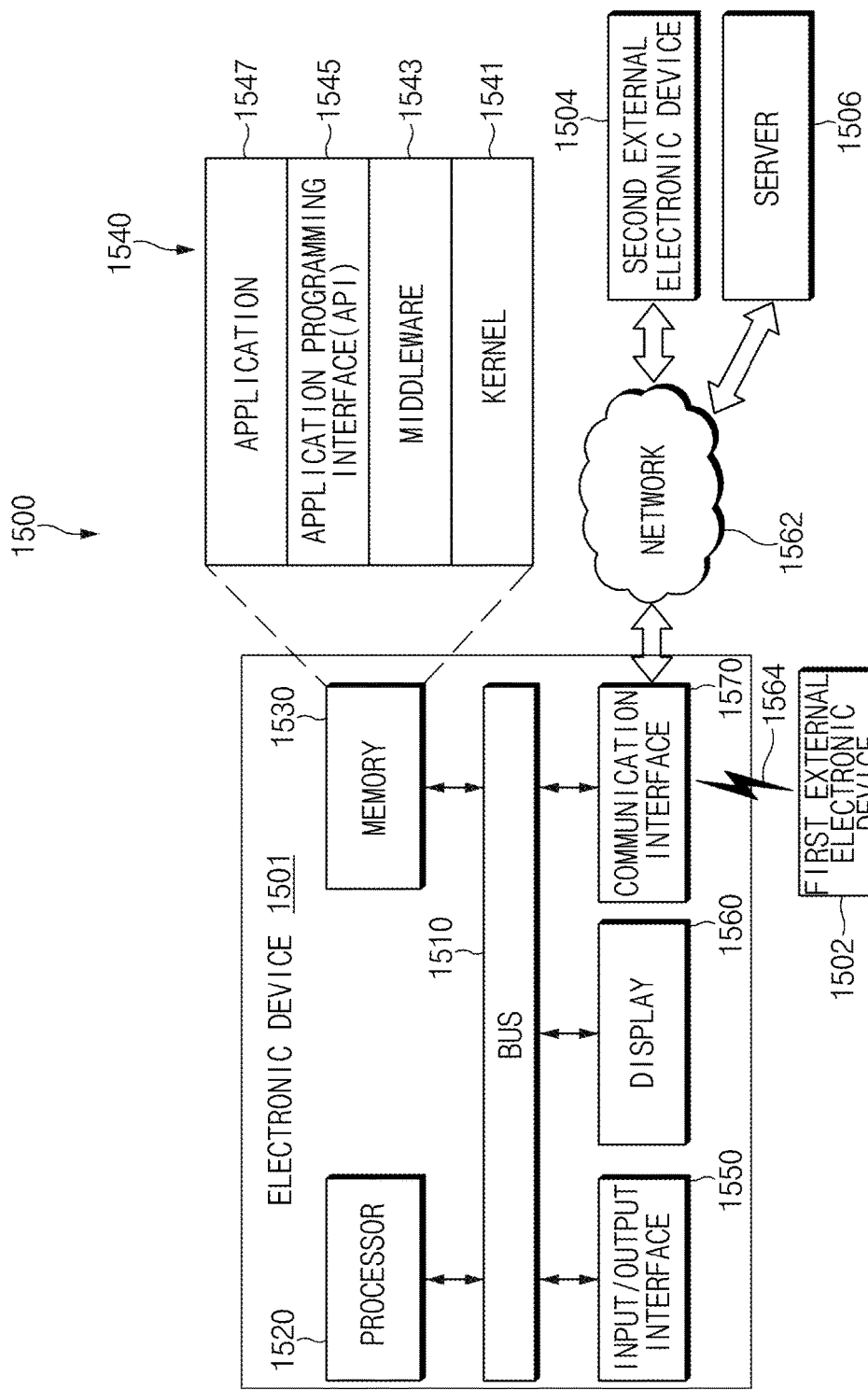
FIG. 15 is a block diagram of an electronic device in a network environment according to various embodiments of the present disclosure.

FIG. 15 is a block diagram of an electronic device in a network environment according to various embodiments of the present disclosure.

Referring to FIG. 15, there is illustrated an electronic device 1501 in a network environment 1500 according to various embodiments of the present disclosure. The electronic device 1501 may include, for example, all or a part of the electronic device 100 illustrated in FIG. 2. The electronic device 1501 may include a bus 1510, a processor 1520, a memory 1530, an input/output (I/O) interface 1550, a display 1560, and a communication interface 1570. According to an embodiment, the electronic device 1501 may not include at least one of the above-described components or may further include other component(s).

For example, the bus 1510 may interconnect the above-described components 1510 to 170 and may include a circuit for conveying communications (e.g., a control message and/or data) among the above-described components.

The processor 1520 may include one or more of a CPU, an AP, or a communication processor (CP). The processor 1520 may perform, for example, data processing or an operation associated with control or communication of at least one other component(s) of the electronic device 1501.

The memory 1530 may include a volatile and/or nonvolatile memory. For example, the memory 1530 may store instructions or data associated with at least one other component(s) of the electronic device 1501. According to an embodiment, the memory 1530 may store software and/or a program 1540.

The program 1540 may include, for example, a kernel 1541, a middleware 1543, an application programming interface (API) 1545, and/or an application program (or an application) 1547. At least a portion of the kernel 1541, the middleware 1543, or the API 1545 may be called an "OS".

The kernel 1541 may control or manage system resources (e.g., the bus 1510, the processor 1520, the memory 1530, and the like) that are used to execute operations or functions of other programs (e.g., the middleware 1543, the API 1545, and the application program 1547). Furthermore, the kernel 1541 may provide an interface that allows the middleware 1543, the API 1545, or the application program 1547 to access discrete components of the electronic device 1501 so as to control or manage system resources.

The middleware 1543 may perform, for example, a mediation role such that the API 1545 or the application program 1547 communicates with the kernel 1541 to exchange data. Furthermore, the middleware 1543 may process one or more task requests received from the application program 1547 according to a priority. For example, the middleware 1543 may assign the priority, which makes it possible to use a system resource (e.g., the bus 1510, the processor 1520, the memory 1530, or the like) of the electronic device 1501, to at least one of the application program 1547.

The API 1545 may be an interface through which the application program 1547 controls a function provided by the kernel 1541 or the middleware 1543, and may include, for example, at least one interface or function (e.g., an instruction) for a file control, a window control, image/video processing, a character control, or the like.

The I/O interface 1550 may transmit an instruction or data, input from a user or another external device, to other component(s) of the electronic device 1501. Furthermore, the I/O interface 1550 may output an instruction or data, received from other component(s) of the electronic device 1501, to a user or another external device.

The display 1560 may include, for example, a liquid crystal display (LCD), a light-emitting diode (LED) display, an organic LED (OLED) display, or a microelectromechanical systems (MEMS) display, or an electronic paper display. The display 1560 may display, for example, various kinds of content (e.g., a text, an image, a video, an icon, a symbol, and the like) to a user. The display 1560 may include a touch screen and may receive, for example, a touch input, a gesture input, a proximity input, or a hovering input using an electronic pen or a portion of a user's body.

The communication interface 1570 may establish communication between the electronic device 1501 and an external electronic device (e.g., a first external electronic device 1502, a second external electronic device 1504, or a server 1506). For example, the communication interface 1570 may be connected to a network 1562 through wireless communication or wire communication and may communicate with an external device (e.g., the second external device 1504 or the server 1506).

The wireless communication may include at least one of, for example, long-term evolution (LTE), LTE advanced (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 1564. The local area network 1564 may include at least one of Wi-Fi, BT, BLE, Zigbee, near field communication (NFC), magnetic secure transmission, or a global navigation satellite system (GNSS). The GNSS may include at least one of a GPS, a global navigation satellite system (Glonass), a Beidou navigation satellite system (hereinafter referred to as "Beidou"), or a European global satellite-based navigation system (Galileo). In this specification, "GPS" and "GNSS" may be interchangeably used.

The wired communication may include at least one of, for example, a USB, an HDMI, a recommended standard-232 (RS-232), power line communication (PLC), or a plain old telephone service (POTS). The network 1562 may include at least one of telecommunications networks, for example, a computer network (e.g., local area network (LAN) or wide area network (WAN)), an Internet, or a telephone network.

Each of the external first and second external electronic devices 1502 and 1504 may be a device of which the type is different from or the same as that of the electronic device 1501. According to an embodiment, the server 1506 may include a group of one or more servers. According to various embodiments, all or a part of operations that the electronic device 1501 will perform may be executed by another or plural electronic devices (e.g., the electronic devices 1502 and 1504 or the server 1506). According to an embodiment, in the case where the electronic device 1501 executes any function or service automatically or in response to a request, the electronic device 1501 may not perform the function or the service internally, but, alternatively additionally, it may request at least a portion of a function associated with the electronic device 1501 from another device (e.g., the electronic device 1502 or 1504 or the server 1506). The other electronic device (e.g., the electronic device 1502 or 1504 or the server 1506) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Figure 16:
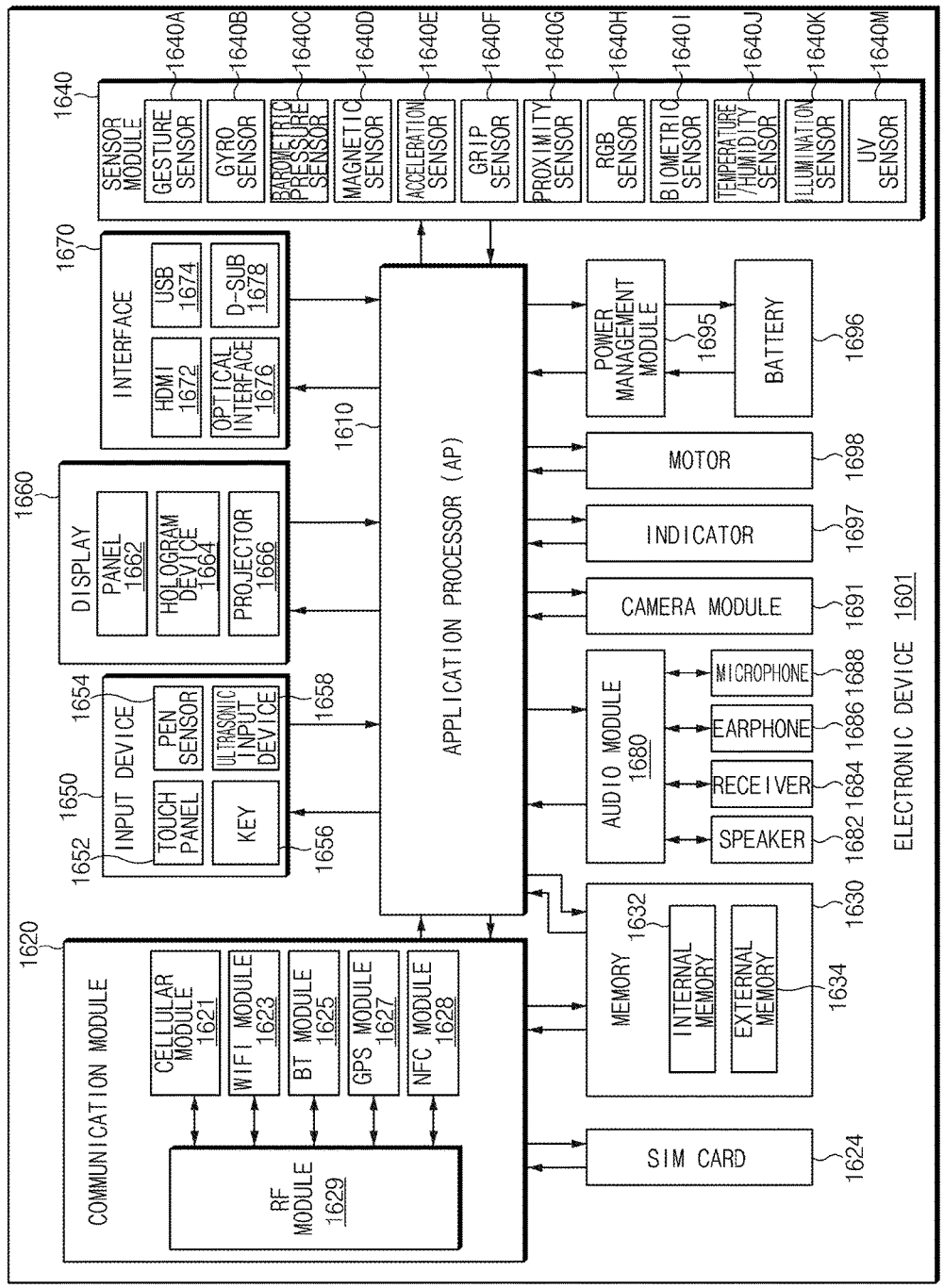
FIG. 16 is a block diagram illustrating an electronic device according to various embodiments of the present disclosure.

FIG. 16 is a block diagram illustrating an electronic device 1601 according to various embodiments of the present disclosure.

Referring to FIG. 16, the electronic device 1601 may include, for example, all or a part of the electronic device 100 illustrated in FIG. 2. The electronic device 1601 may include one or more processors (e.g., an AP) 1610, a communication module 1620, a subscriber identification module (SIM) 1624, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may drive an OS or an application to control a plurality of hardware or software components connected to the processor 1610 and may process and compute a variety of data. The processor 1610 may be implemented with an SoC, for example. According to an embodiment, the processor 1610 may further include a graphics processing unit (GPU) and/or an image signal processor (ISP). The processor 1610 may include at least a portion (e.g., a cellular module 1621) of components illustrated in FIG. 16. The processor 1610 may load and process an instruction or data, which is received from at least one of other components (e.g., a nonvolatile memory), and may store a variety of data at a nonvolatile memory.

The communication module 1620 may be configured the same as or similar to a communication interface 1570 of FIG. 15. The communication module 1620 may include the cellular module 1621, a Wi-Fi module 1623, a BT module 1625, a GNSS module 1627 (e.g., a GPS module, a Glonass module, Beidou module, or a Galileo module), an NFC module 1628, and a radio frequency (RF) module 1629.

The cellular module 1621 may provide voice communication, video communication, a character service, an Internet service, or the like through a communication network. According to an embodiment, the cellular module 1621 may perform discrimination and authentication of the electronic device 1601 within a communication network using a SIM 1624 (e.g., a SIM card), for example. According to an embodiment, the cellular module 1621 may perform at least a portion of functions that the processor 1610 provides. According to an embodiment, the cellular module 1621 may include a CP.

According to an embodiment, at least a portion (e.g., two or more components) of the cellular module 1621, the Wi-Fi module 1623, the BT module 1625, the GNSS module 1627, or the NFC module 1628 may be included within one integrated circuit (IC) or an IC package.

The RF module 1629 may transmit and receive, for example, a communication signal (e.g., an RF signal). The RF module 1629 may include a transceiver, a power amplifier module (PAM), a frequency filter, a low noise amplifier (LNA), an antenna, or the like. According to various embodiments, at least one of the cellular module 1621, the Wi-Fi module 1623, the BT module 1625, the GNSS module 1627, or the NFC module 1628 may transmit and receive an RF signal through a separate RF module.

The SIM 1624 may include, for example, a card, including a SIM, and/or an embedded SIM and may include unique identification information (e.g., integrated circuit card identifier (ICCID)) or subscriber information (e.g., integrated mobile subscriber identity (IMSI)).

The memory 1630 may include, for example, an internal memory 1632 or an external memory 1634. For example, the internal memory 1632 may include at least one of a volatile memory (e.g., a dynamic RAM (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1634 may include a flash drive, for example, compact flash (CF), SD, micro-SD, mini-SD, extreme digital (xD), MMC, a memory stick, or the like. The external memory 1634 may be functionally and/or physically connected with the electronic device 1601 through various interfaces.

The sensor module 1640 may measure, for example, a physical quantity or may detect an operation status of the electronic device 1601. The sensor module 940 may convert the measured or detected information to an electrical signal. The sensor module 1640 may include at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., RGB sensor), a biometric sensor 1640I, a temperature/humidity sensor 1640J, an illuminance sensor 1640K, or an ultraviolet (UV) sensor 1640M. Even though not illustrated, additionally or alternatively, the sensor module 1640 may include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1640 may further include a control circuit for controlling at least one or more sensors included therein. According to an embodiment, the electronic device 1601 may further include a processor which is a part of the processor 1610 or independent of the processor 1610 and is configured to control the sensor module 1640. The processor may control the sensor module 1640 while the processor 1610 remains at a sleep state.

The input device 1650 may include, for example, a touch panel 1652, a (digital) pen sensor 1654, a key 1656, or an ultrasonic input unit 1658. The touch panel 1652 may use at least one of capacitive, resistive, infrared and ultrasonic detecting methods. Also, the touch panel 1652 may further include a control circuit. The touch panel 1652 may further include a tactile layer to provide a tactile reaction to a user.

The (digital) pen sensor 1654 may be, for example, a part of a touch panel or may include an additional sheet for recognition. The key 1656 may include, for example, a physical button, an optical key, a keypad, and the like. The ultrasonic input device 1658 may detect (or sense) an ultrasonic signal, which is generated from an input device, through a microphone (e.g., a microphone 1688) and may verify data corresponding to the detected ultrasonic signal.

The display 1660 (e.g., the display 1560) may include a panel 1662, a hologram device 1664, or a projector 1666. The panel 1662 may be implemented to be flexible, transparent or wearable, for example. The panel 1662 and the touch panel 1652 may be integrated into a single module. The hologram device 1664 may display a stereoscopic image in a space using a light interference phenomenon. The projector 1666 may project light onto a screen so as to display an image. The screen may be arranged inside or outside the electronic device 1601. According to an embodiment, the display 1660 may further include a control circuit for controlling the panel 1662, the hologram device 1664, or the projector 1666.

The interface 1670 may include, for example, an HDMI 1672, a USB 1674, an optical interface 1676, or a D-sub-miniature (D-sub) 1678. The interface 1670 may be included, for example, in the communication interface 1570 illustrated in FIG. 15. Additionally or alternatively, the interface 1670 may include, for example, a MHL interface, a SD card/MMC interface, or an infrared data association (IrDA) standard interface.

The audio module 1680 may convert a sound and an electric signal in dual directions. At least a portion of the audio module 1680 may be included, for example, in an I/O interface 1550 illustrated in FIG. 15. The audio module 1680 may process, for example, sound information that is input or output through a speaker 1682, a receiver 1684, an earphone 1686, or the microphone 1688.

The camera module 1691 for shooting a still image or a video may include, for example, at least one image sensor (e.g., a front sensor or a rear sensor), a lens, an ISP, or a flash (e.g., an LED or a xenon lamp)

The power management module 1695 may manage, for example, power of the electronic device 1601. According to an embodiment, a power management IC (PMIC), a charger IC, or a battery or fuel gauge may be included in the power management module 1695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1696 and a voltage, current or temperature thereof while the battery is charged. The battery 1696 may include, for example, a rechargeable battery or a solar battery.

The indicator 1697 may display a specific state of the electronic device 1601 or a portion thereof (e.g., the processor 1610), such as a booting state, a message state, a charging state, and the like. The motor 1698 may convert an electrical signal into a mechanical vibration and may generate effects such as vibration, haptic, and the like. Even though not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. According to various embodiments, the electronic device 1601 may not include a part of elements thereof or may further include other component(s). Furthermore, some of the elements of the electronic device according to various embodiments may be combined with each other so as to form one entity, so that the functions of the elements may be performed in the same manner as before the combination.

Figure 17:
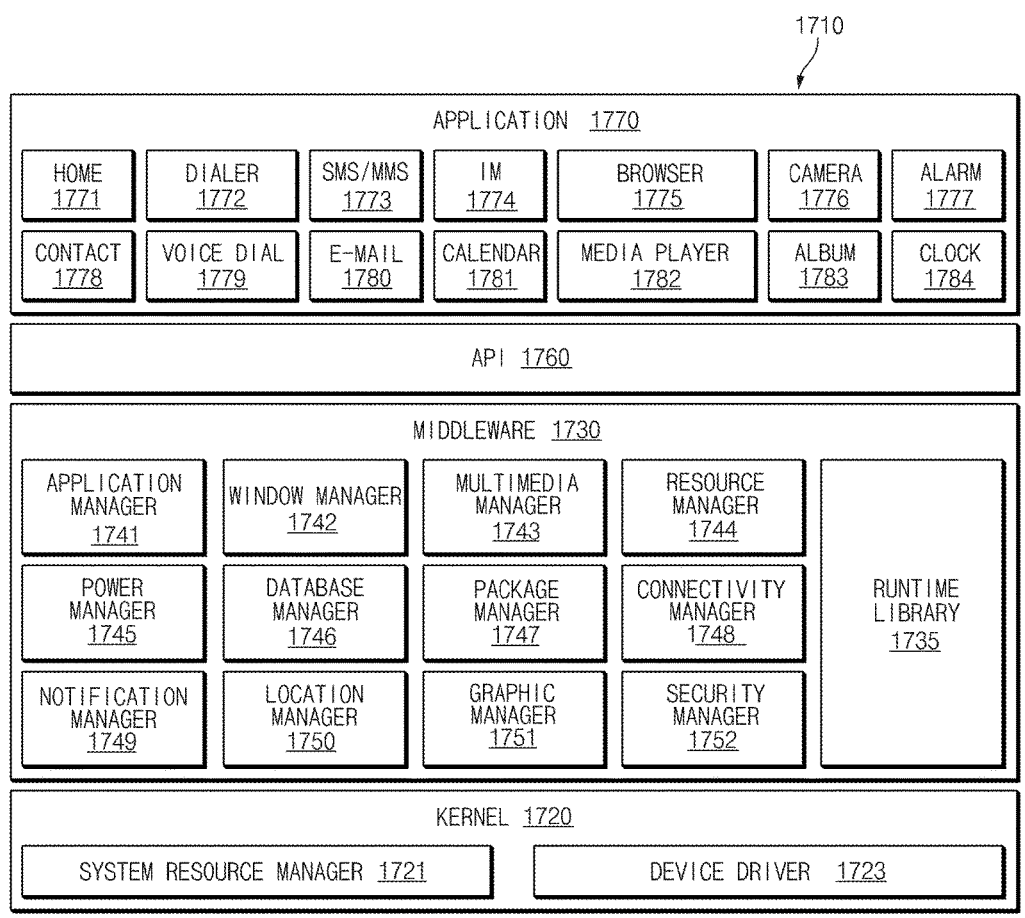
FIG. 17 illustrates a block diagram of a program module according to various embodiments of the present disclosure.

FIG. 17 illustrates a block diagram of a program module according to various embodiments of the present disclosure.

Referring to FIG. 17, a program module 1710 (e.g., the program 1540) may include an OS to control resources associated with an electronic device (e.g., the first electronic device 100), and/or diverse applications (e.g., the application program 1547) driven on the OS. The OS may be, for example, Android, iOS, Windows, Symbian, Tizen, or Bada.

The program module 1710 may include, for example, a kernel 1720, a middleware 1730, an API 1760, and/or an application 1770. At least a portion of the program module 1710 may be preloaded on an electronic device or may be downloadable from external electronic devices (e.g., the first and second external electronic devices 1502 or 1504, the server 1506, and the like).

The kernel 1720 (e.g., the kernel 1541) may include, for example, a system resource manager 1721 and/or a device driver 1723. The system resource manager 1721 may perform control, allocation, or retrieval of system resources. According to an embodiment, the system resource manager 1721 may include a process managing part, a memory managing part, or a file system managing part. The device driver 1723 may include, for example, a display driver, a camera driver, a BT driver, a common memory driver, a USB driver, a keypad driver, a Wi-Fi driver, an audio driver, or an inter-process communication (IPC) driver.

The middleware 1730 may provide, for example, a function which the application 1770 needs in common or may provide diverse functions to the application 1770 through the API 1760 to allow the application 1770 to efficiently use limited system resources of the electronic device. According to an embodiment, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include, for example, a library module which is used by a compiler to add a new function through a programming language while the application 1770 is being executed. The runtime library 1735 may perform I/O management, memory management, or capacities about arithmetic functions.

The application manager 1741 may manage, for example, a life cycle of at least one application of the application 1770. The window manager 1742 may manage a graphical user interface (GUI) resource which is used in a screen. The multimedia manager 1743 may identify a format necessary for playing diverse media files and may perform encoding or decoding of media files by using a codec suitable for the format. The resource manager 1744 may manage resources such as a storage space, memory, or source code of at least one application of the application 1770.

The power manager 1745 may operate, for example, with a basic input/output system (BIOS) to manage a battery or power and may provide power information for an operation of an electronic device. The database manager 1746 may generate, search for, or modify database which is to be used in at least one application of the application 1770. The package manager 1747 may install or update an application which is distributed in the form of a package file.

The connectivity manager 1748 may manage, for example, wireless connection such as Wi-Fi or BT. The notification manager 1749 may display or notify of an event such as an arrival message, a promise, or a proximity notification in a mode that does not disturb a user. The location manager 1750 may manage location information of an electronic device. The graphic manager 1751 may manage a graphic effect that is provided to a user, or manage a UI relevant thereto. The security manager 1752 may provide a general security function necessary for system security or user authentication. According to an embodiment, in the case where an electronic device (e.g., the electronic device 100) includes a telephony function, the middleware 1730 may further includes a telephony manager for managing a voice or video call function of the electronic device.

The middleware 1730 may include a middleware module that combines diverse functions of the above-described components. The middleware 1730 may provide a module specialized to each OS kind to provide differentiated functions. Additionally, the middleware 1730 may remove a part of the preexisting components, dynamically, or may add a new component thereto.

The API 1760 (e.g., the API 1545) may be, for example, a set of programming functions and may be provided with a configuration which is variable depending on an OS. For example, in the case where an OS is the android or the iOS, it may be permissible to provide one API set per platform. In the case where an OS is the Tizen, it may be permissible to provide two or more API sets per platform.

The application 1770 (e.g., the application program 1547) may include, for example, one or more applications capable of providing functions for a home 1771, a dialer 1772, a short message service (SMS)/multimedia messaging service (MMS) 1773, an instant message (IM) 1774, a browser 1775, a camera 1776, an alarm 1777, a contact 1778, a voice dial 1779, an e-mail 1780, a calendar 1781, a media player 1782, an album 1783, and a timepiece 1784, or for offering health care (e.g., measuring an exercise quantity or blood sugar) or environment information (e.g., atmospheric pressure, humidity, or temperature).

According to an embodiment, the application 1770 may include an application (hereinafter referred to as "information exchanging application" for descriptive convenience) to support information exchange between the electronic device (e.g., the first electronic device 100) and an external electronic device (e.g., the adapter device 200). The information exchanging application may include, for example, a notification relay application for transmitting specific information to the external electronic device, or a device management application for managing the external electronic device.

For example, the information exchanging application may include a function of transmitting notification information, which is generated from other applications (e.g., applications for SMS/MMS, e-mail, health care, or environmental information), to an external electronic device. Additionally, the information exchanging application may receive, for example, notification information from an external electronic device and may provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1502 or 1504) which communicates with the electronic device, an application running in the external electronic device, or a service (e.g., a call service or a message service) provided from the external electronic device.

According to an embodiment, the application 1770 may include an application (e.g., a health care application of a mobile medical device, and the like) which is assigned in accordance with attributes of the external electronic device (e.g., the electronic device 1502 or 1504). According to an embodiment, the application 1770 may include an application which is received from an external electronic device (e.g., the server 1506 or the external electronic device 1502 or 1504). According to an embodiment, the application 1770 may include a preloaded application or a third party application which is downloadable from a server. The component titles of the program module 1710 according to the embodiment may be modifiable depending on kinds of OSs.

According to various embodiments, at least a portion of the program module 1710 may be implemented by software, firmware, hardware, or a combination of two or more thereof. At least a portion of the program module 1710 may be implemented (e.g., executed), for example, by a processor (e.g., the processor 1610). At least a portion of the program module 1710 may include, for example, modules, programs, routines, sets of instructions, or processes, or the like for performing one or more functions.

The term "module" as used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by the processor 118, may cause the processor to perform a function corresponding to the instruction. The computer-readable storage media, for example, may be a memory (e.g., the memory 130).

A computer-readable recording medium may include a hard disk, a magnetic media, a floppy disk, a magnetic media (e.g., a magnetic tape), an optical media (e.g., a compact disc ROM (CD-ROM), a DVD, or a magneto-optical media (e.g., a floptical disk)), and hardware devices (e.g., a ROM, a RAM, or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to various embodiments of the present disclosure, a speed in which a video is processed can be improved by simplifying a video processing process of a portable electronic device, and noise generated during the video processing process can be reduced. Furthermore, as a video processing process for all external displays is performed in a process, the processed result can be conveyed to an external device of a chip using a universal serial interface (i.e., USB). Accordingly, the process does not need to include a serial interface for an external display. According to various embodiments of the present disclosure, a manufacturing process may be simplified by omitting a separate connector for transmission of video data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first buffer configured to store video data; and
   a system on chip,
   wherein the system on chip comprises:
      a compression circuit configured to compress the video data stored in the first buffer,
      an encryption circuit configured to encrypt the compressed video data, and
      a universal serial bus (USB) hardware interface configured to transmit the encrypted video data,
   wherein the compression circuit, the encryption circuit, and the USB hardware interface are connected by a dedicated data path, and
   wherein the video data is transmitted through the dedicated data path passing through the first buffer.

2. The electronic device of claim 1, wherein the dedicated data path is placed inside the system on chip.

3. The electronic device of claim 1, wherein the encrypted video data to be transmitted by the USB hardware interface comprises data that is generated according to a protocol different from a USB protocol.

4. The electronic device of claim 1, wherein the USB hardware interface transmits the encrypted video data using an isochronous mode or a bulk mode.

5. The electronic device of claim 1, further comprising:
   a USB connector configured to receive the encrypted video data from the system on chip and transmit the received encrypted video data to an external device.

6. The electronic device of claim 5, wherein the USB connector comprises a USB type-C connector.

7. The electronic device of claim 5, wherein the USB connector is connected with the external device in an alternate mode and is further configured to transmit the encrypted video data in the alternate mode.

8. The electronic device of claim 5, further comprising:
   a fourth buffer configured to store audio data,
   wherein the USB hardware interface is further configured to:
      transmit the encrypted video data through a first communication channel set to a first pin of the USB connector, and
      transmit the audio data through a second communication channel set to the first pin.

9. The electronic device of claim 8, wherein the USB hardware interface is further configured to:
   transmit a control signal to the external device through a third communication channel set to the first pin of the USB connector, and
   receive a control signal from the external device through a fourth communication channel set to a second pin of the USB connector.

10. An electronic device comprising:
    a first buffer configured to store video data;
    a compression circuit configured to compress the video data;
    an encryption circuit configured to encrypt the compressed video data; and
    a universal serial bus (USB) hardware interface configured to transmit the encrypted video data to an external device,
    wherein the compression circuit, the encryption circuit, and the USB hardware interface are connected by a dedicated data path, and
    wherein the video data is transmitted through the dedicated data path passing through the first buffer.

11. The electronic device of claim 10, wherein the encrypted video data to be transmitted to the external device by the USB hardware interface comprises data that is generated according to a protocol different from a USB protocol.

12. The electronic device of claim 10, wherein the USB hardware interface is further configured to transmit the encrypted video data to the external device using an isochronous mode or a bulk mode.

13. The electronic device of claim 10, further comprising:
    a USB connector configured to receive the encrypted video data from the USB hardware interface and transmit the received encrypted video data to the external device.

14. The electronic device of claim 13, wherein the USB connector is connected with the external device in an alternate mode and transmits the encrypted video data in the alternate mode.

15. The electronic device of claim 13, further comprising:
    a fourth buffer configured to store audio data,
    wherein the USB hardware interface is further configured to:
       transmit the encrypted video data through a first communication channel set to a first pin of the USB connector, and
       transmit the audio data through a second communication channel set to the first pin.

16. The electronic device of claim 15, wherein the USB hardware interface is further configured to:
    transmit a control signal to the external device through a third communication channel set to the first pin of the USB connector, and receive a control signal from the external device through a fourth communication channel set to a second pin of the USB connector.

17. The electronic device of claim 10, further comprising:
a second buffer configured to store the compressed video data to be transmitted to the encryption circuit; and
a third buffer configured to store the encrypted video data to be transmitted to the USB hardware interface.

18. A system on chip comprising:
a buffer configured to store video data;
a compression circuit configured to compress video data;
an encryption circuit configured to encrypt the compressed video data; and
a universal serial bus (USB) hardware interface configured to transmit the encrypted video data,
wherein the compression circuit, the encryption circuit, and the USB hardware interface are connected by a dedicated data path, and
wherein the video data is transmitted through the dedicated data path passing through the buffer.

19. The system on chip of claim 18, wherein the encrypted video data to be transmitted to an external device by the USB hardware interface comprises data that is generated according to a protocol different from a USB protocol.

20. The system on chip of claim 18, wherein the USB hardware interface is further configured to transmit the encrypted video data to an external device using an isochronous mode or a bulk mode.

21. The system on chip of claim 18, further comprising:
a multiplexer configured to multiplex the compressed video data and audio data,
wherein the encryption circuit is further configured to encrypt the multiplexed video data.

* * * * *